US009671587B2

United States Patent
Hashimoto

(10) Patent No.: US 9,671,587 B2
(45) Date of Patent: Jun. 6, 2017

(54) IMAGING LENS COMPOSED OF FIVE OPTICAL ELEMENTS

(71) Applicant: KANTATSU CO., LTD., Yaita-shi, Tochigi (JP)

(72) Inventor: Masaya Hashimoto, Sukagawa (JP)

(73) Assignee: KANTATSU CO., LTD., Yaita (JP)

( * ) Notice: Subject to any disclaimer, the term of this patent is extended or adjusted under 35 U.S.C. 154(b) by 140 days.

(21) Appl. No.: 14/662,481

(22) Filed: Mar. 19, 2015

(65) Prior Publication Data

US 2015/0277084 A1    Oct. 1, 2015

(30) Foreign Application Priority Data

Mar. 27, 2014 (JP) ................................. 2014-065344

(51) Int. Cl.
| | | |
|---|---|---|
| G02B 9/60 | (2006.01) | |
| G02B 13/18 | (2006.01) | |
| G02B 13/00 | (2006.01) | |
| G02B 27/00 | (2006.01) | |

(52) U.S. Cl.
CPC ......... *G02B 13/0045* (2013.01); *G02B 13/18* (2013.01); *G02B 9/60* (2013.01); *G02B 27/0025* (2013.01)

(58) Field of Classification Search
CPC ................................................ G02B 13/0045
USPC .................................................. 359/713, 714
See application file for complete search history.

(56) References Cited

U.S. PATENT DOCUMENTS

| | | | | |
|---|---|---|---|---|
| 8,179,615 | B1 * | 5/2012 | Tang ................... | G02B 13/0045 359/714 |
| 2011/0013069 | A1 * | 1/2011 | Chen ........................ | G02B 9/60 348/335 |
| 2011/0249346 | A1 * | 10/2011 | Tang ................... | G02B 13/0045 359/764 |
| 2012/0069455 | A1 * | 3/2012 | Lin ..................... | G02B 13/0045 359/714 |
| 2012/0212660 | A1 * | 8/2012 | Tang ................... | G02B 13/0045 348/345 |
| 2012/0262806 | A1 * | 10/2012 | Huang ............... | G02B 13/0045 359/784 |

(Continued)

FOREIGN PATENT DOCUMENTS

| | | |
|---|---|---|
| JP | 2010-026434 A | 2/2010 |
| JP | 2010-271541 A | 12/2010 |

*Primary Examiner* — Scott J Sugarman
(74) *Attorney, Agent, or Firm* — Oliff PLC

(57) ABSTRACT

A low-profile, high-resolution, low-cost imaging lens comprises five optical elements arranged from an object side: a first positive optical element group including a first positive lens having a convex object-side surface as a first optical element and a second negative lens having a concave image-side surface as a second optical element; a second positive optical element group including a third positive lens having a convex image-side surface as a third optical element; and a third negative optical element group including a fourth negative double-sided aspheric lens having a concave image-side surface as a fourth optical element. The image-side surface of the fourth lens has at least one pole-change point off an optical axis. A double-sided aspheric aberration correction optical element with virtually no refractive power as a fifth optical element is located in an air gap nearer to the image plane than the first optical element group.

17 Claims, 14 Drawing Sheets

(56) References Cited

U.S. PATENT DOCUMENTS

| | | | | |
|---|---|---|---|---|
| 2012/0287513 A1* | 11/2012 | Hsu | ................... | G02B 13/0045 |
| | | | | 359/714 |
| 2012/0300315 A1* | 11/2012 | Chen | ................. | G02B 13/0045 |
| | | | | 359/714 |
| 2013/0002920 A1* | 1/2013 | Sano | ................. | G02B 13/0045 |
| | | | | 348/311 |
| 2013/0021679 A1* | 1/2013 | Tsai | ................. | G02B 13/0045 |
| | | | | 359/714 |
| 2013/0021680 A1* | 1/2013 | Chen | ................. | G02B 13/0045 |
| | | | | 359/714 |
| 2013/0033637 A1* | 2/2013 | Sano | ................. | G02B 13/0045 |
| | | | | 348/340 |
| 2013/0038947 A1* | 2/2013 | Tsai | ..................... | G02B 13/18 |
| | | | | 359/714 |
| 2014/0063596 A1* | 3/2014 | Jung | ................. | G02B 13/0045 |
| | | | | 359/357 |
| 2014/0063620 A1* | 3/2014 | Jung | ................. | G02B 13/0045 |
| | | | | 359/714 |

\* cited by examiner

IMAGING LENS COMPOSED OF FIVE OPTICAL ELEMENTS

The present application is based on and claims priority of Japanese patent application No. 2014-065344 filed on Mar. 27, 2014, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in a compact image pickup device, and more particularly to an imaging lens composed of five optical elements which is built in an image pickup device mounted in an increasingly compact and low-profile smartphone, mobile phone, PDA (Personal Digital Assistant), a game console, an information terminal such as a PC, or a home appliance with a camera function.

In the present invention, whether or not an optical element is a lens depends on whether or not it has refractive power on an optical axis. An optical element having refractive power on the optical axis is a lens. An optical element which does not have a lens function can contribute to improvement of aberrations in the peripheral area of an image without changing the overall focal length. In terms of lens surface shape, a convex surface or a concave surface means that the paraxial portion of the surface (the portion near the optical axis) is convex or concave. A "pole-change point" on an aspheric surface means a point on the aspheric surface at which a tangential plane intersects the optical axis perpendicularly.

Description of the Related Art

In recent years, there has been a general tendency that many information terminals have a camera function. Also, home appliances with a camera have been introduced into the market. For example, a user who is away from home can see in real time what is going on at home, through the camera mounted in a home appliance by telecommunication between the home appliance and his/her smartphone. It is thought that products which enhance consumer convenience by adding a camera function to an information terminal or home appliance will be increasingly developed in the future. The camera mounted in such products is required not only to provide high resolution to cope with an increase in the number of pixels but also to be compact and low-profile and offer high brightness and a wide field of view.

However, in order to provide a low-profile imaging lens with a wide field of view and high brightness, the following problem has to be addressed: it is difficult to correct aberrations in the peripheral area of an image and deliver high optical performance throughout the image. Even though the use of glass material for the lenses may address the above problem to a certain degree, glass material is not suitable for mass production and thus it is difficult to achieve low-cost mass production.

Conventionally, for example, the imaging lenses described in JP-A-2010-271541 (Patent Document 1) and JP-A-2010-026434 (Patent Document 2) are known as imaging lenses intended to offer a wide field of view and deliver high performance.

Patent Document 1 discloses an imaging lens which includes, in order from an object side to an image side, a first lens with positive refractive power as a biconvex lens, a second lens with negative refractive power having a concave surface on the image side, a third lens with positive refractive power as a meniscus lens having a convex surface on the image side, and a fourth lens with negative refractive power as a double-sided aspheric lens having a concave surface near an optical axis on the image side.

Patent Document 2 discloses a compact imaging lens intended to correct various aberrations properly, which includes, in order from an object side, a first positive lens, a second positive lens, a third negative lens, a fourth positive lens and a fifth negative lens.

The imaging lens described in Patent Document 1 is relatively low-profile in which the total track length is about 5.4 mm and the ratio of the total track length to the diagonal length of the effective imaging plane of the image sensor is about 0.9. However, since it is composed of four elements, it cannot correct aberrations properly. Also, although it offers a relatively wide field of view, its F-value is about 2.8, which is not sufficient to meet the recent demand for high-brightness imaging lenses.

The imaging lens described in Patent Document 2, composed of five elements, has a total track length of about 7.8 mm and the ratio of the total track length to the diagonal length of the effective imaging plane of the image sensor is about 1.1, which is disadvantageous in making the imaging lens more low-profile. The imaging lens composed of five elements corrects various aberrations properly and offers high brightness with an F-value of about 2.0 to about 2.5. However, its maximum field of view is about 62 degrees and if an attempt is made to widen the field of view, a problem will arise with correction of aberrations in the peripheral area of an image.

As mentioned above, in the conventional art, it is difficult to provide a low-profile high-resolution imaging lens with a wide field of view and high brightness.

SUMMARY OF THE INVENTION

The present invention has been made in view of the above problem, and an object thereof is to provide a compact low-cost imaging lens composed of five elements, which meets the demand for low-profileness, offers brightness with an F-value of 2.4 or less and a wide field of view and corrects various aberrations properly.

Here, "low-profile" implies that the total track length is shorter than the diagonal length of the effective imaging plane of the image sensor, and "wide field of view" implies that the field of view is 70 degrees or more. The diagonal length of the effective imaging plane of the image sensor means twice the vertical height from an optical axis to the position where a light ray incident on the imaging lens at a maximum field of view enters the image plane, that is, the diameter of an effective image circle whose radius is the maximum image height.

According to an aspect of the present invention, there is provided an imaging lens composed of five optical elements which forms an image of an object on a solid-state image sensor and has an F-value of 2.4 or less, in which the elements are arranged in order from an object side to an image side as follows: a first optical element group with positive refractive power including a first lens with positive refractive power having a convex surface on the object side as a first optical element, and a second lens with negative refractive power having a concave surface on the image side as a second optical element; a second optical element group with positive refractive power including a third lens with positive refractive power having a convex surface on the image side as a third optical element; and a third optical element group with negative refractive power including a fourth double-sided aspheric lens with negative refractive power having a concave surface on the image side as a fourth optical element. The image-side surface of the fourth lens has at least one pole-change point off an optical axis, and as a fifth optical element, a double-sided aspheric aberration correction optical element with virtually no refractive power is located in an air gap nearer to an image plane than the first optical element group.

In the imaging lens composed of five optical elements with the above configuration, the first positive optical element group, the second positive optical element group and the third negative optical element group are arranged in order from the objet side, making a so-called telephoto type power arrangement, which is advantageous in making the imaging lens low-profile.

In the imaging lens composed of five optical elements, the first optical element group uses the first positive lens to achieve low-profileness and the second negative lens to correct spherical aberrations and chromatic aberrations properly. The second optical element group uses the third lens, which has relatively strong positive refractive power, to ensure low-profileness and correct coma aberrations and field curvature. The third optical element group uses the fourth negative lens to correct spherical aberrations which occur on the third lens. The fourth lens also has an aspheric surface with at least one pole-change point off the optical axis on its image side to correct field curvature and distortion and control the angle of a chief ray incident on the image sensor appropriately. The aberration correction optical element, which has virtually no refractive power, corrects aberrations in the peripheral area of the image properly through its aspheric surfaces on the both sides.

In the imaging lens composed of five optical elements, the aberration correction optical element with virtually no refractive power as the fifth optical element is located in the air gap between the first optical element group and the second optical element group, in the air gap between the second optical element group and the third optical element group, or in the air gap between the third optical element group and the image plane so that aberrations, particularly in the peripheral area of the optical element group located nearer to the object than the aberration correction optical element, can be corrected properly through the aspheric surfaces on the both sides and thus aberrations of rays over a wide field of view are improved effectively.

Preferably, the imaging lens composed of five optical elements satisfies conditional expressions (1) and (2) below:

$$0.1 < TN/f < 0.5 \quad (1)$$

$$40 < vdN < 60 \quad (2)$$

where
TN: distance on the optical axis between lenses where the aberration correction optical element is located,
f: focal length of the overall optical system of the imaging lens, and
vdN: Abbe number of the aberration correction optical element at d-ray.

The conditional expression (1) defines an appropriate range for the space where the aberration correction optical element is located, and indicates a condition to ensure low-profileness and correct aberrations in the peripheral area properly. If the value is above the upper limit of the conditional expression (1), the space for the aberration correction optical element would be too large to ensure low-profileness. On the other hand, if the value is below the lower limit, the space for the aberration correction optical element would be too small, which would impose a restriction on the aspheric shapes of the both surfaces of the aberration correction optical element and make it difficult to correct aberrations properly. If the aberration correction optical element is located between the fourth lens and the image plane, the "distance on the optical axis between lenses where the aberration correction optical element is located" in the conditional expression (1) means the distance on the optical axis between the image-side surface of the fourth lens and the image plane.

The conditional expression (2) defines an appropriate range for the Abbe number of the material of the aberration correction optical element. When a material which satisfies the conditional expression (2), that is, a low-dispersion material, is adopted, aberrations in the peripheral area are corrected properly.

Preferably, the imaging lens composed of five optical elements satisfies conditional expressions (3) and (4) below:

$$4.0 < (d2/f) \times 100 < 10.0 \quad (3)$$

$$0.4 < (t1/f) \times 100 < 1.5 \quad (4)$$

where
d2: thickness of the second lens on the optical axis,
t1: air gap on the optical axis between the first lens and the second lens, and
f: focal length of the overall optical system of the imaging lens.

The conditional expression (3) defines an appropriate range for the thickness of the second lens on the optical axis, and indicates a condition to ensure high formability of the second lens and low-profileness. If the value is above the upper limit of the conditional expression (3), the thickness of the second lens on the optical axis would be too large and it would be difficult to provide an appropriate air gap on the object side and the image side of the second lens, which might result in a longer total track length. On the other hand, if the value is below the lower limit of the conditional expression (3), the thickness of the second lens on the optical axis would be too small to ensure formability of the second lens.

The conditional expression (4) defines an appropriate range for the air gap on the optical axis between the first lens and the second lens, and indicates a condition to ensure low-profileness and high assemblability. If the value is above the upper limit of the conditional expression (4), the distance on the optical axis between the first lens and the second lens would be too large to ensure low-profileness and it would cause increase in distortion and field curvature. On the other hand, if the value is below the lower limit of the conditional expression (4), the air gap on the optical axis between the first lens and the second lens would be too small, which would increase the risk that the first lens and the second lens contact each other when the imaging lens is assembled.

In the imaging lens composed of five optical elements, it is preferable that the aspheric surfaces on the both sides of the aberration correction optical element be shaped so as to curve toward the object side with increasing distance from the optical axis. These aspheric surfaces make it possible to control the angles of rays emitted from the aberration correction optical element and suppress aberrations of marginal rays. Thus, it is easy to correct aberrations in the peripheral area which may increase as the field of view is wider and the F-value is smaller.

Preferably, the imaging lens composed of five optical elements satisfies a conditional expression (5) below:

$$0.85 < fLG1/f < 1.7 \quad (5)$$

where
fLG1: focal length of the first optical element group, and
f: focal length of the overall optical system of the imaging lens.

The conditional expression (5) defines an appropriate range for the ratio of the focal length of the first optical element group to the focal length of the overall optical system of the imaging lens, and indicates a condition to ensure low-profileness and correct chromatic aberrations. If the value is above the upper limit of the conditional expression (5), the positive refractive power of the first optical element group would be too weak to ensure low-profileness. On the other hand, if the value is below the lower limit of the conditional expression (5), the positive refractive power of the first optical element group would be too strong to correct chromatic aberrations properly.

Preferably, the imaging lens composed of five optical elements satisfies a conditional expression (6) below:

$$0.3 < fLG2/f < 1.4 \quad (6)$$

where
fLG2: focal length of the second optical element group, and
f: focal length of the overall optical system of the imaging lens.

The conditional expression (6) defines an appropriate range for the ratio of the focal length of the second optical element group to the focal length of the overall optical system of the imaging lens, and indicates a condition to ensure low-profileness and correct spherical aberrations and coma aberrations. If the value is above the upper limit of the conditional expression (6), the positive refractive power of the second optical element group would be too weak to ensure low-profileness. On the other hand, if the value is below the lower limit of the conditional expression (6), the positive refractive power of the second optical element group would be too strong to correct spherical aberrations and coma aberrations properly.

Preferably, the imaging lens composed of five optical elements satisfies a conditional expression (7) below:

$$-1.2 < fLG3/f < -0.2 \quad (7)$$

where
fLG3: focal length of the third optical element group, and
f: focal length of the overall optical system of the imaging lens.

The conditional expression (7) defines an appropriate range for the ratio of the focal length of the third optical element group to the focal length of the overall optical system of the imaging lens, and indicates a condition to ensure low-profileness and correct spherical aberrations and chromatic aberrations. If the value is above the upper limit of the conditional expression (7), the negative refractive power of the third optical element group would be too strong to ensure low-profileness. On the other hand, if the value is below the lower limit of the conditional expression (7), the negative refractive power of the third optical element group would be too weak to correct spherical aberrations and chromatic aberrations properly.

Preferably, the imaging lens composed of five optical elements satisfies a conditional expression (8) below:

$$0.7 < (r5+r6)/(r5-r6) < 6.5 \quad (8)$$

where
r5: curvature radius of the object-side surface of the third lens constituting the second optical element group, and
r6: curvature radius of the image-side surface of the third lens constituting the second optical element group.

The conditional expression (8) defines an appropriate range for the shape of the third lens constituting the second optical element group, and indicates a condition to ensure low-profileness and correct spherical aberrations properly. When the conditional expression (8) is satisfied, the third lens has a biconvex shape or a meniscus shape with a convex surface on the image side. If the value is above the upper limit of the conditional expression (8), the third lens would have a stronger meniscus shape which causes the image side principal point position of the third lens to shift toward the image side, resulting in a longer total track length and making it difficult to ensure low-profileness. Furthermore, if so, spherical aberrations might be too excessive to be corrected by the fourth lens. On the other hand, if the value is below the lower limit of the conditional expression (8), the third lens would be a biconvex lens in which the image side principal point position of the third lens shifts toward the object side, and it would be difficult to ensure an appropriate back focus, though it would be advantageous in ensuring low-profileness and suppressing spherical aberrations.

Preferably, the imaging lens composed of five optical elements satisfies conditional expressions (9) and (10) below:

$$fLG1 > fLG2 \quad (9)$$

$$fLG2 \geq |fLG3| \quad (10)$$

where
fLG1: focal length of the first optical element group,
fLG2: focal length of the second optical element group, and
fLG3: focal length of the third optical element group.

The conditional expression (9) defines an appropriate relation between the focal length of the first positive optical element group and the focal length of the second positive optical element group, and indicates a condition to ensure low-profileness and correct various aberrations properly. When the conditional expression (9) is satisfied, the positive refractive power of the first optical element group is prevented from being too excessive and aberrations of the first optical element group are corrected easily and the second optical element group is given strong positive refractive power to make it easy to ensure low-profileness. The conditional expression (10) defines an appropriate relation between the focal length of the second positive optical element group and the focal length of the third negative optical element group, and indicates a condition to make it easy for the third negative optical element group to correct spherical aberrations which occur on the third lens with strong positive refractive power for low-profileness.

In addition, in the imaging lens composed of five optical elements, it is preferable that the Abbe number of the optical element with negative refractive power in the first optical element group be from 20 to 30 and the Abbe numbers of the three other optical elements with refractive power be from 40 to 70. When the negative optical element in the first optical element group is made of high-dispersion material, axial chromatic aberrations and chromatic aberrations of magnification can be corrected properly. When the three other optical elements with refractive power are made of low-dispersion material, chromatic aberrations of magnification can be suppressed easily. The above-defined ranges of Abbe numbers suggest that all optical elements with refractive power can be made of plastic material, so the imaging lens can be manufactured at low cost.

DETAILED DESCRIPTION OF THE PREFERRED EMBODIMENT

Hereinafter, the preferred embodiment of the present invention will be described in detail referring to the accompanying drawings. FIGS. 1, 3, 5, 7, 9, 11, and 13 are schematic views showing the general configurations of the imaging lenses in Examples 1 to 7 according to this embodiment of the present invention, respectively. Since all these examples have the same basic lens configuration, the general configuration of an imaging lens according to this embodiment is explained below mainly referring to the schematic view of Example 1.

Figure 1:
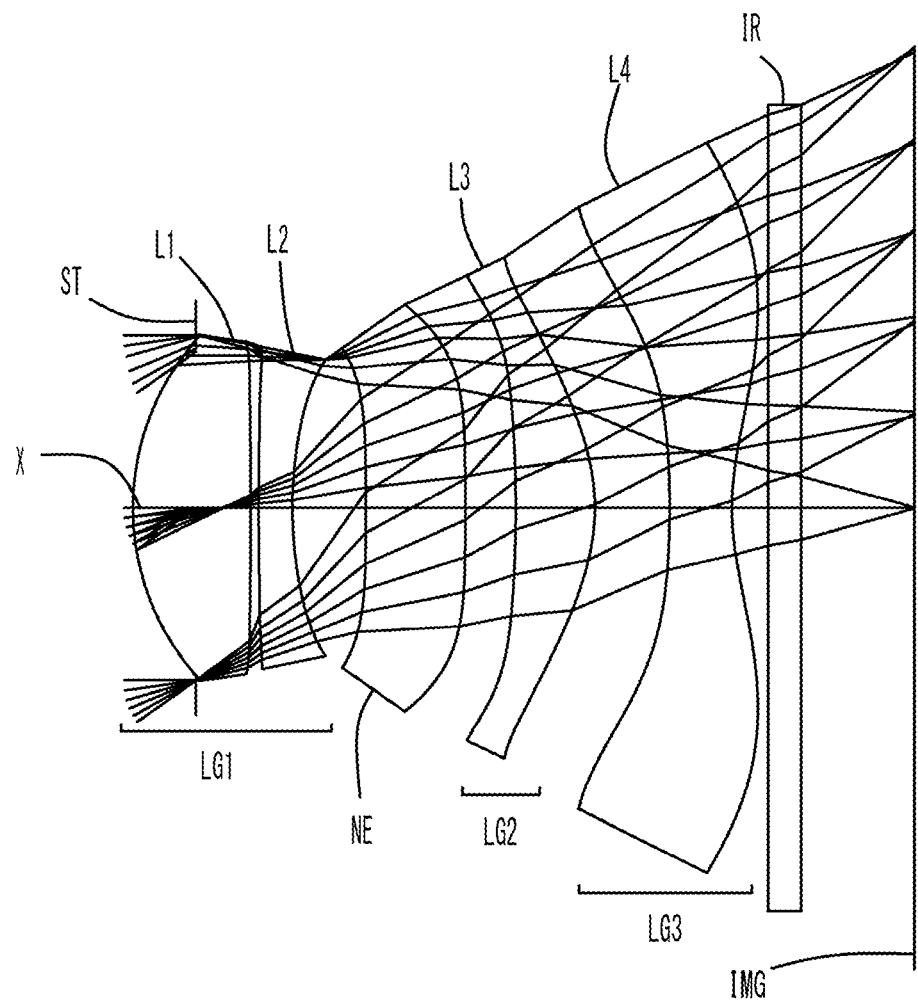
FIG. 1 is a schematic view showing the general configuration of an imaging lens in Example 1 according to an embodiment of the present invention.

As shown in FIG. 1, the imaging lens composed of five optical elements according to this embodiment includes, in order from an object side, a first optical element group LG1 with positive refractive power including a first positive lens L1 as a first optical element and a second negative lens L2 as a second optical element, a second optical element group LG2 with positive refractive power including a third positive lens L3 as a third optical element, and a third optical element group LG3 with negative refractive power including a fourth double-sided aspheric lens L4 as a fourth optical element. As a fifth optical element, a double-sided aspheric aberration correction optical element NE with virtually no refractive power is located between the first optical element group LG1 and the second optical element group LG2. Thus, the imaging lens according to this embodiment includes a total of five optical elements: four optical elements with refractive power and one aberration correction optical element with virtually no refractive power. As mentioned above, the three optical element groups are positive, positive, and negative refractive power optical element groups arranged in order from the object side, offering an advantageous configuration to achieve low-profileness or shorten the total track length.

A filter IR such as an infrared cut filter is located between the third optical element group LG3 and the image plane IMG. The filter IR is omissible. The values of total track length and back focus of the imaging lens according to this embodiment are defined as equivalent air distances. An aperture stop ST is located on the object side of the first lens L1.

In this embodiment, in the first optical element group LG1, the first lens L1, a meniscus lens with relatively strong positive refractive power having a convex surface on the object side, contributes to low-profileness, the second lens L2, a meniscus lens with negative refractive power having a concave surface on the image side, corrects spherical aberrations and chromatic aberrations properly. In the second optical element group LG2, the third lens L3, a meniscus double-sided aspheric lens with relatively strong positive refractive power having a convex surface on the image side, contributes to low-profileness and corrects coma aberrations and field curvature. In the third optical element group LG3, the fourth lens L4, a biconcave double-sided aspheric lens with negative refractive power having a concave surface on the object side and the image side, effectively corrects spherical aberrations which occur on the third lens L3, and also corrects field curvature and distortion. The image-side surface of the fourth lens L4 has a pole-change point off the optical axis so that the negative refractive power of the fourth lens L4 changes to positive refractive power in the peripheral portion. The refractive power of the fourth lens L4 is appropriately changed in the area from the central portion to the peripheral portion so as to correct field curvature and appropriately control the angle of a chief ray incident on the image sensor. Furthermore, the aberration correction optical element NE, a double-sided aspheric optical element which has a flat surface near the optical axis X on both sides and has virtually no refractive power, is located in the air gap between the first optical element group LG1 and the second optical element group LG2 so that aberrations in the peripheral area are corrected properly through its aspheric surfaces on the both sides.

The first lens L1 in the first optical element group LG1 only has to be a lens with positive refractive power having a convex surface on the object side and as in the examples other than Example 1, it may have a biconvex shape with a convex surface on each of the object side and the image side. The second lens L2 in the first optical element group LG1 only has to be a lens with negative refractive power having a concave surface on the image side and as in Examples 2 and 6 shown in FIGS. 3 and 11 respectively, it may have a biconcave shape with a concave surface on each of the object side and the image side. The third lens L3 constituting the second optical element group LG2 only has to be a lens with positive refractive power having a convex surface on the image side and as in Example 4 shown in FIG. 7, it may have a biconvex shape with a convex surface on each of the object side and the image side. The fourth lens L4 constituting the third optical element group LG3 only has to be a lens with negative refractive power having a concave surface on the image side and as in Examples 3, 6, and 7 shown in FIGS. 5, 11, and 13 respectively, it may have a meniscus shape with a concave surface on the image side.

The aberration correction optical element NE, a double-sided aspheric optical element which has a flat surface near the optical axis X on both sides and has virtually no refractive power, should be located in an air gap nearer to the image plane than the first optical element group LG1. In Example 6 shown in FIG. 11, it is located between the second optical element group LG2 and the third optical element group LG3, and in Example 7 shown in FIG. 13, it is located between the third optical element group LG3 and the image plane IMG.

The aperture stop ST is located on the object side of the first optical element group LG1. Therefore, the exit pupil position is remote from the image plane IMG, so it is easy to ensure telecentricity.

Since the aberration correction optical element NE with virtually no refractive power in this embodiment has a parallel plate shape near the optical axis X, it influences neither the refractive power of the overall optical system of the imaging lens, nor the refractive power of any of the four constituent lenses from the first lens L1 as the first optical element to the fourth lens L4 as the fourth optical element. Therefore, it is possible to correct aberrations only in the peripheral area without changing parameters such as focal length and lens center thickness.

The both aspheric surfaces of the aberration correction optical element NE are shaped so as to curve toward the object side with increasing distance from the optical axis X. These aspheric surfaces control the angles of rays emitted from the aberration correction optical element NE and make it easy to suppress aberrations of marginal rays. Consequently, aberrations in the peripheral area which may increase as the field of view is wider and the F-value is smaller are corrected properly.

When the imaging lens composed of five optical elements according to this embodiment satisfies conditional expressions (1) to (10) below, it brings about advantageous effects:

$$0.1 < TN/f < 0.5 \tag{1}$$

$$40 < vdN < 60 \tag{2}$$

$$4.0 < (d2/f) \times 100 < 10.0 \tag{3}$$

$$0.4 < (t1/f) \times 100 < 1.5 \tag{4}$$

$$0.85 < fLG1/f < 1.7 \tag{5}$$

$$0.3 < fLG2/f < 1.4 \tag{6}$$

$$-1.2 < fLG3/f < -0.2 \tag{7}$$

$$0.7 < (r5+r6)/(r5-r6) < 6.5 \tag{8}$$

$$fLG1 > fLG2 \tag{9}$$

$$fLG2 \geq |fLG3| \tag{10}$$

where
TN: distance on the optical axis X between lenses where the aberration correction optical element NE is located,
f: focal length of the overall optical system of the imaging lens,
vdN: Abbe number of the aberration correction optical element NE at d-ray,
d2: center thickness of the second lens L2,
t1: air gap on the optical axis X between the first lens L1 and the second lens L2,
fLG1: focal length of the first optical element group LG1,
fLG2: focal length of the second optical element group LG2,
fLG3: focal length of the third optical element group LG3,
r5: curvature radius of the object-side surface of the third lens L3 constituting the second optical element group, and
r6: curvature radius of the image-side surface of the third lens L3 constituting the second optical element group.

When the imaging lens composed of five optical elements according to this embodiment satisfies conditional expressions (1a) to (8a) below, it brings about more advantageous effects:

$$0.2 < TN/f < 0.50 \tag{1a}$$

$$50 < vdN < 60 \tag{2a}$$

$$4.2 < (d2/f) \times 100 < 8.8 \tag{3a}$$

$$0.45 < (t1/f) \times 100 < 1.4 \tag{4a}$$

$$0.95 < fLG1/f < 1.55 \tag{5a}$$

$$0.4 < fLG2/f < 1.3 \tag{6a}$$

$$-1.0 < fLG3/f < -0.4 \tag{7a}$$

$$0.7 < (r5+r6)/(r5-r6) < 2.0. \tag{8a}$$

The signs in the above conditional expressions have the same meanings as in the preceding paragraph.

When the imaging lens composed of five optical elements according to this embodiment satisfies conditional expressions (1b) to (8b) below, it brings about particularly advantageous effects:

$$0.25 \leq TN/f \leq 0.45 \tag{1b}$$

$$53 \leq vdN \leq 58 \tag{2b}$$

$$4.61 \leq (d2/f) \times 100 \leq 7.95 \tag{3b}$$

$$0.49 \leq (t1/f) \times 100 \leq 1.26 \tag{4b}$$

$$1.07 \leq fLG1/f \leq 1.40 \tag{5b}$$

$$0.44 \leq fLG2/f \leq 1.19 \tag{6b}$$

$$-0.93 \leq fLG3/f \leq -0.45 \tag{7b}$$

$$0.92 \leq (r5+r6)/(r5-r6) \leq 1.87. \tag{8b}$$

The signs in the above conditional expressions have the same meanings as in the preceding paragraph.

When the conditional expression (1) is satisfied, the space required for the aberration correction optical element NE is adequately secured and the flexibility in the aspheric shape of the aberration correction optical element NE is increased while low-profileness is ensured, and aberrations in the peripheral area are corrected properly. As for TN in the conditional expression (1), if the aberration correction optical element NE is located between the fourth lens L4 constituting the third optical element group LG3 and the image plane IMG, "distance on the optical axis X between lenses where the aberration correction optical element NE is located" means the distance on the optical axis X between the image-side surface of the fourth lens L4 and the image plane IMG.

When the conditional expression (2) is satisfied, the aberration correction optical element NE is made of low-dispersion material and aberrations in the peripheral area can be corrected properly.

When the conditional expression (3) is satisfied, the thickness of the second lens L2 on the optical axis X is within an appropriate range to maintain high formability of the second lens L2 and ensure low-profileness.

When the conditional expression (4) is satisfied, the air gap on the optical axis X between the first lens L1 and the second lens L2 is within an appropriate range to ensure low-profileness and high assemblability.

When the conditional expression (5) is satisfied, the ratio of the focal length fLG1 of the first optical element group LG1 to the focal length f of the overall optical system of the imaging lens is within an appropriate range to ensure low-profileness and correct chromatic aberrations properly.

When the conditional expression (6) is satisfied, the ratio of the focal length fLG2 of the second optical element group LG2 to the focal length f of the overall optical system of the imaging lens is within an appropriate range to ensure low-profileness and correct spherical aberrations and coma aberrations properly.

When the conditional expression (7) is satisfied, the ratio of the focal length fLG3 of the third optical element group LG3 to the focal length f of the overall optical system of the imaging lens is within an appropriate range to ensure low-profileness and correct spherical aberrations and chromatic aberrations properly.

When the conditional expression (8) is satisfied, the shape of the third lens L3 constituting the second optical element group LG2 is optimized to ensure low-profileness and make it easy for the fourth lens L4 to correct spherical aberrations.

When the conditional expression (9) is satisfied, the distribution of positive refractive power between the first optical element group LG1 and the second optical element group LG2 is optimized to ensure low-profileness.

When the conditional expression (10) is satisfied, spherical aberrations which occur on the third lens L3 constituting the second optical element group LG2 with strong positive refractive power are suppressed and it is easy for the third optical element group LG3 to correct aberrations.

In the imaging lens composed of five optical elements according to this embodiment, the Abbe number of the optical element with negative refractive power in the first optical element group LG1 is within the range from 20 to 30, and the Abbe numbers of the three other optical elements with refractive power are within the range from 40 to 70. The negative optical element in the first optical element group LG1 is made of high-dispersion material so as to correct axial chromatic aberrations and chromatic aberrations of magnification properly, and the three other optical elements with refractive power are made of low-dispersion material so as to suppress chromatic aberrations of magnification. Lenses whose Abbe numbers are within these ranges can be made of plastic material. Moreover, the aberration correction optical element NE may be made of plastic material which satisfies the conditional expression (2). Therefore, the imaging lens can be manufactured at low cost.

In this embodiment, all the lens surfaces are aspheric. The aspheric shapes of these lens surfaces are expressed by Equation 1, where Z denotes an axis in the optical axis direction, H denotes a height perpendicular to the optical axis, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \quad \text{Equation 1}$$

Next, examples of the imaging lens according to this embodiment will be explained. In each example, f denotes the focal length of the overall optical system of the imaging lens, Fno denotes an F-number, ω denotes a half field of view, ih denotes a maximum image height, and TLA denotes a total track length as an equivalent air distance. i denotes a surface number counted from the object side, r denotes a curvature radius, d denotes the distance on the optical axis between lens surfaces (surface distance), Nd denotes a refractive index at d-ray (reference wavelength), and νd denotes an Abbe number at d-ray. As for aspheric surfaces, an asterisk (*) after surface number i indicates that the surface concerned is an aspheric surface.

EXAMPLE 1

The basic lens data of Example 1 is shown in Table 1 below.

TABLE 1 in mm f = 4.12
Fno = 1.9
ω(°) = 35.2
ih = 2.93
TLA = 4.91
bf = 1.10

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | −0.402 | | |
| 2* | 1.644 | 0.748 | 1.544 | 55.57 |
| 3* | 90.000 | 0.052 | | |
| 4* | 11.613 | 0.215 | 1.635 | 23.91 |
| 5* | 2.517 | 0.466 | | |
| 6* | Infinity | 0.633 | 1.535 | 56.16 |

TABLE 1-continued

| | | | | |
|---|---|---|---|---|
| 7* | Infinity | 0.323 | | |
| 8* | −8.155 | 0.503 | 1.544 | 55.57 |
| 9* | −1.308 | 0.476 | | |
| 10* | −6.842 | 0.397 | 1.535 | 56.16 |
| 11* | 1.697 | 0.230 | | |
| 12 | Infinity | 0.210 | 1.517 | 64.20 |
| 13 Image Plane | Infinity | 0.727 | | |

| Constituent Lens Data | | | Lens Group Data | | |
|---|---|---|---|---|---|
| Lens | Start Surface | Focal Length | | Lens | Focal Length |
| 1 | 2 | 3.07 | 1st Optical Element Group (LG1) | Lens 1, 2 | 5.70 |
| 2 | 4 | −5.11 | | | |
| 3 | 6 | 2.79 | 2nd Optical Element Group (LG2) | Lens 3 | 2.79 |
| 4 | 10 | −2.50 | 3rd Optical Element Group (LG3) | Lens 4 | −2.50 |

Aspheric Surface Data

| | 2nd Surface | 3rd Surface | 4th Surface | 5th Surface | 6th Surface |
|---|---|---|---|---|---|
| k  | 4.117E−01 | 0.000E+00 | 0.000E+00 | −2.373E+00 | 0.000E+00 |
| A4 | −3.212E−03 | −1.135E−01 | −2.139E−01 | −9.186E−02 | −1.293E−01 |
| A6 | −6.023E−03 | 3.552E−01 | 6.165E−01 | 3.325E−01 | 2.269E−02 |
| A8 | −1.309E−02 | −6.586E−01 | −9.869E−01 | −3.704E−01 | −6.079E−02 |
| A10 | 2.252E−03 | 8.274E−01 | 1.112E+00 | 3.025E−01 | 5.781E−02 |
| A12 | 1.951E−02 | −6.098E−01 | −7.857E−01 | −1.589E−01 | −2.733E−02 |
| A14 | −1.568E−02 | 1.774E−01 | 2.355E−01 | 5.025E−02 | 0.000E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k  | 0.000E+00 | 0.000E+00 | −4.298E+00 | 0.000E+00 | −8.721E+00 |
| A4 | −9.599E−02 | 9.295E−03 | −5.197E−02 | −8.398E−02 | −7.147E−02 |
| A6 | −2.196E−02 | −1.398E−02 | 5.262E−02 | 1.240E−02 | 2.276E−02 |
| A8 | −1.083E−02 | −2.102E−02 | −2.682E−02 | 3.929E−03 | −6.033E−03 |
| A10 | 5.841E−03 | 8.422E−03 | 6.450E−03 | −9.315E−04 | 9.777E−04 |
| A12 | 0.000E+00 | −6.680E−05 | −3.728E−04 | 4.980E−05 | −8.205E−05 |
| A14 | 0.000E+00 | 0.000E+00 | 0.000E+00 | 0.000E+00 | 2.803E−06 |
| A16 | 0.000E+00 | 0.000E+00 | 0.000E+00 | 0.000E+00 | 0.000E+00 |

As shown in Table 8, the imaging lens in Example 1 satisfies all the conditional expressions (1) to (10).

Figure 2:
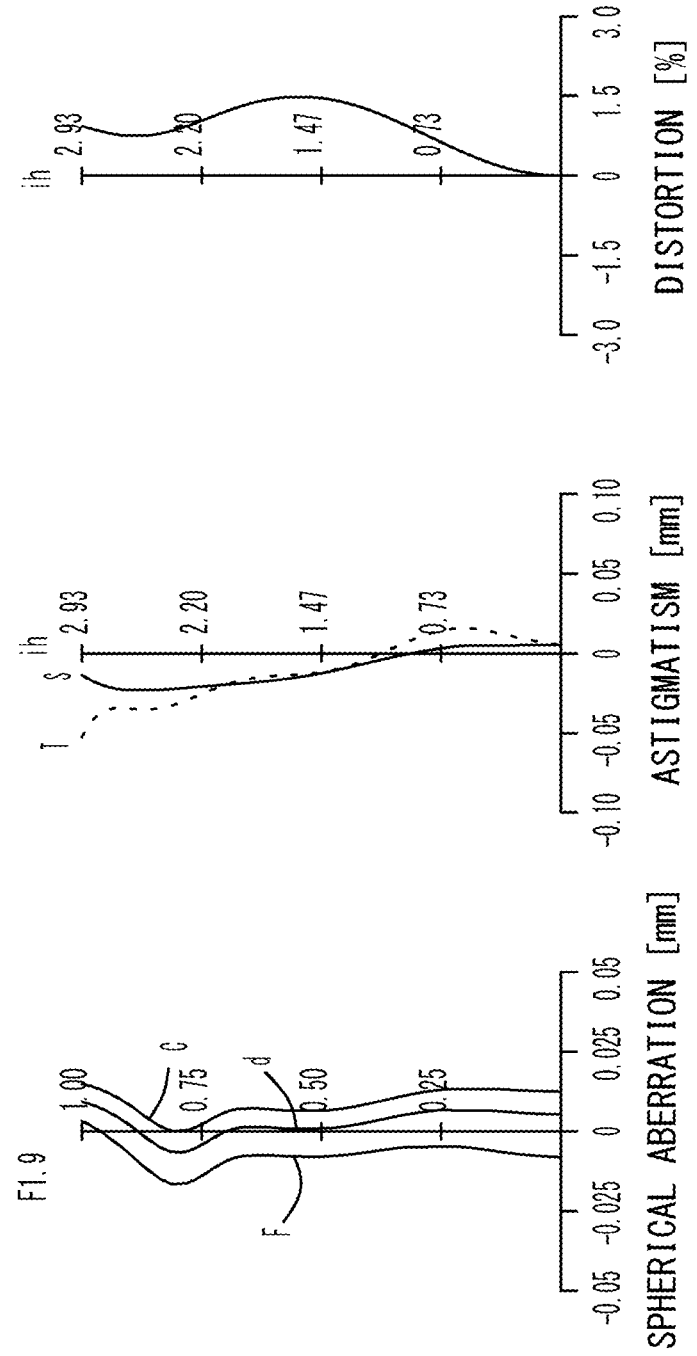
FIG. 2 shows spherical aberration, astigmatism, and distortion of the imaging lens in Example 1.
Figure 3:
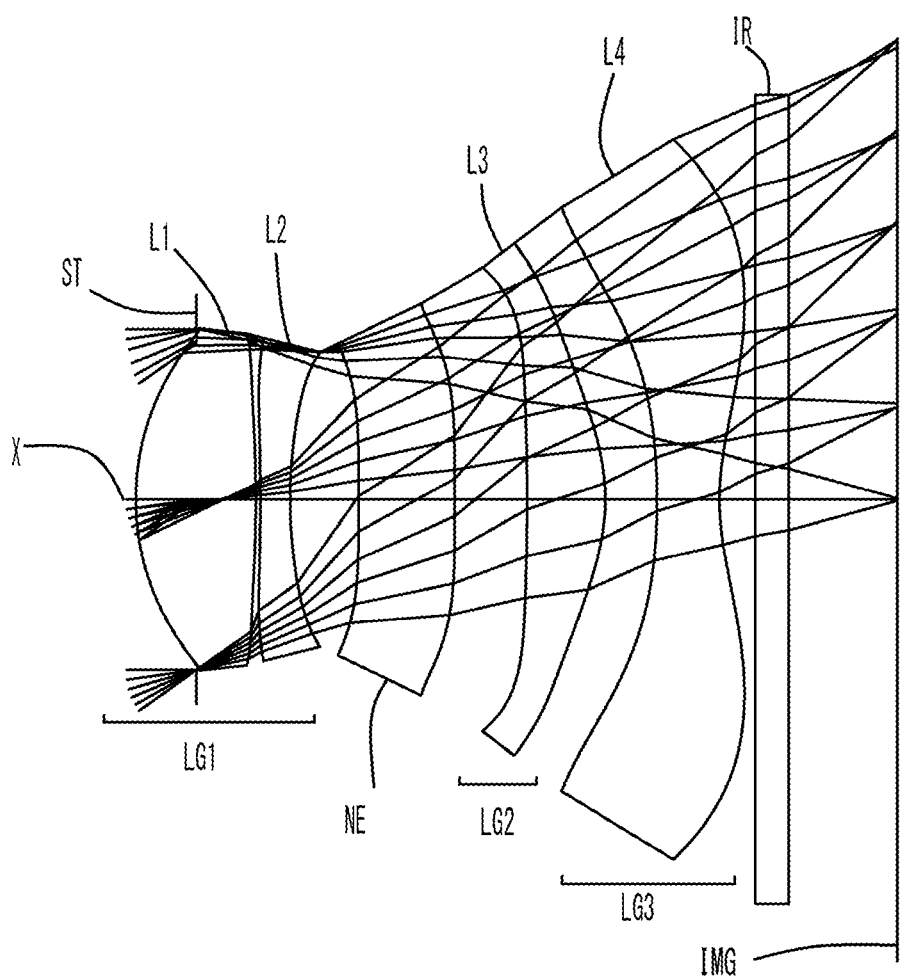
FIG. 3 is a schematic view showing the general configuration of an imaging lens in Example 2 according to the embodiment of the present invention.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on sagittal image surface S and the amount of aberration at d-ray on tangential image surface T (the same is true for FIGS. 4, 6, 8, 10, 12, and 14). As shown in FIG. 2, each aberration is corrected properly.

In Example 1, the total track length is 4.91 mm, which suggests that the imaging lens is low-profile though it uses five optical elements. Moreover, it provides a wide field of view of about 70 degrees and brightness with an F-value of 1.9.

EXAMPLE 2

The basic lens data of Example 2 is shown in Table 2 below.

TABLE 2 in mm f = 4.12
Fno = 1.9
ω(°) = 35.2
ih = 2.93
TLA = 4.78
bf = 1.11

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | −0.387 | | |
| 2* | 1.611 | 0.763 | 1.544 | 55.57 |

TABLE 2-continued

| | | | | |
|---|---|---|---|---|
| 3* | −10.607 | 0.029 | | |
| 4* | −90.000 | 0.190 | 1.635 | 23.91 |
| 5* | 2.765 | 0.436 | | |
| 6* | Infinity | 0.611 | 1.535 | 56.16 |
| 7* | Infinity | 0.461 | | |
| 8* | −15.593 | 0.499 | 1.544 | 55.57 |
| 9* | −1.287 | 0.330 | | |
| 10* | −4.102 | 0.397 | 1.535 | 56.16 |
| 11* | 1.583 | 0.230 | | |
| 12 | Infinity | 0.210 | 1.517 | 64.20 |
| 13 | Infinity | 0.697 | | |
| Image Plane | | | | |

| Constituent Lens Data | | | Lens Group Data | | |
|---|---|---|---|---|---|
| Lens | Start Surface | Focal Length | | Lens | Focal Length |
| 1 | 2 | 2.63 | 1st Optical Element Group (LG1) | Lens 1, 2 | 5.11 |
| 2 | 4 | −4.22 | | | |
| 3 | 8 | 2.55 | 2nd Optical Element Group (LG2) | Lens 3 | 2.55 |
| 4 | 10 | −2.09 | | | |
| | | | 3rd Optical Element Group (LG3) | Lens 4 | −2.09 |

Aspheric Surface Data

| | 2nd Surface | 3rd Surface | 4th Surface | 5th Surface | 6th Surface |
|---|---|---|---|---|---|
| k | 2.568E−01 | 0.000E+00 | 0.000E+00 | −4.688E+00 | 0.000E+00 |
| A4 | 3.935E−04 | −7.719E−02 | −1.910E−01 | −1.032E−01 | −1.478E−01 |
| A6 | −7.359E−03 | 3.516E−01 | 6.296E−01 | 3.274E−01 | 1.017E−02 |
| A8 | −8.083E−03 | −6.794E−01 | −9.878E−01 | −3.343E−01 | −4.083E−02 |
| A10 | −4.672E−03 | 8.398E−01 | 1.121E+00 | 2.949E−01 | 7.088E−02 |
| A12 | 1.951E−02 | −6.098E−01 | −7.857E−01 | −1.589E−01 | −2.733E−02 |
| A14 | −1.568E−02 | 1.774E−01 | 2.355E−01 | 5.025E−02 | 0.000E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | 0.000E+00 | −4.616E+00 | 0.000E+00 | −1.045E+01 |
| A4 | −1.083E−01 | 1.640E−02 | −1.674E−03 | −5.630E−02 | −7.074E−02 |
| A6 | −3.465E−03 | −6.561E−03 | 4.337E−03 | 9.140E−03 | 2.387E−02 |
| A8 | −1.153E−02 | −2.031E−02 | −3.028E−02 | 2.745E−03 | −6.641E−03 |
| A10 | 1.421E−02 | 7.328E−03 | 6.221E−03 | −6.310E−04 | 1.006E−03 |
| A12 | 0.000E+00 | −1.084E−03 | −3.462E−04 | 3.133E−05 | −7.712E−05 |
| A14 | 0.000E+00 | 0.000E+00 | 0.000E+00 | 0.000E+00 | 2.355E−06 |
| A16 | 0.000E+00 | 0.000E+00 | 0.000E+00 | 0.000E+00 | 0.000E+00 |

As shown in Table 8, the imaging lens in Example 2 satisfies all the conditional expressions (1) to (10).

Figure 4:
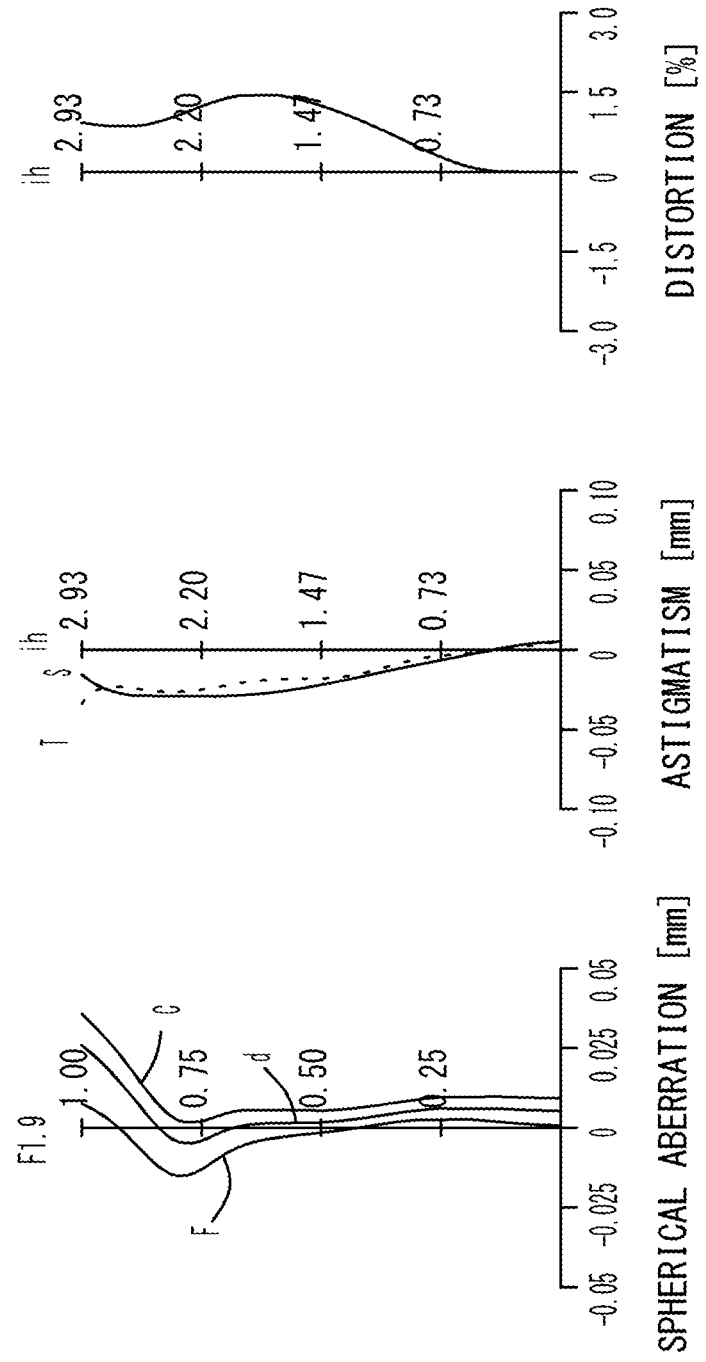
FIG. 4 shows spherical aberration, astigmatism, and distortion of the imaging lens in Example 2.
Figure 5:
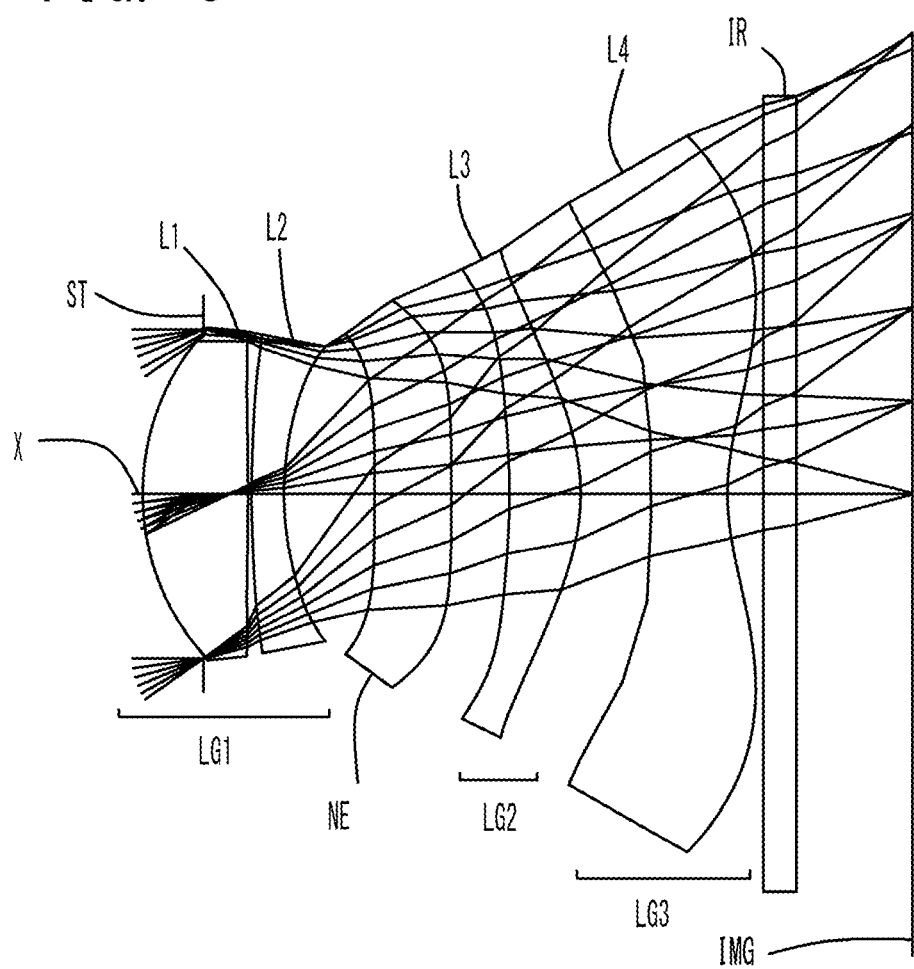
FIG. 5 is a schematic view showing the general configuration of an imaging lens in Example 3 according to the embodiment of the present invention.

FIG. 4 shows spherical aberration (mm), astigmatism (mm), and distortion (%) of the imaging lens in Example 2. As shown in FIG. 4, each aberration is corrected properly.

In Example 2, the total track length is 4.78 mm, which suggests that the imaging lens is low-profile though it uses five optical elements. Moreover, it provides a wide field of view of about 70 degrees and brightness with an F-value of 1.9.

EXAMPLE 3

The basic lens data of Example 3 is shown in Table 3 below.

TABLE 3 in mm f = 4.19
Fno = 2.0
ω(°) = 34.7
ih = 2.93
TLA = 4.83
bf = 1.11

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | −0.341 | | |
| 2* | 1.585 | 0.669 | 1.544 | 55.57 |

TABLE 3-continued

| | | | | |
|---|---|---|---|---|
| 3* | −31.390 | 0.024 | | |
| 4* | 5.710 | 0.206 | 1.635 | 23.91 |
| 5* | 1.861 | 0.576 | | |
| 6* | Infinity | 0.488 | 1.535 | 56.16 |
| 7* | Infinity | 0.371 | | |
| 8* | −4.732 | 0.454 | 1.544 | 55.57 |
| 9* | −1.338 | 0.446 | | |
| 10* | 90.000 | 0.488 | 1.535 | 56.16 |
| 11* | 1.502 | 0.230 | | |
| 12 | Infinity | 0.210 | 1.517 | 64.20 |
| 13 Image Plane | Infinity | 0.743 | | |

| Constituent Lens Data | | | Lens Group Data | | |
|---|---|---|---|---|---|
| Lens | Start Surface | Focal Length | | Lens | Focal Length |
| 1 | 2 | 2.79 | 1st Optical Element Group (LG1) | Lens 1, 2 | 5.45 |
| 2 | 4 | −4.44 | | | |
| 3 | 8 | 3.27 | 2nd Optical Element Group (LG2) | Lens 3 | 3.27 |
| 4 | 10 | −2.86 | | | |
| | | | 3rd Optical Element Group (LG3) | Lens 4 | −2.86 |

Aspheric Surface Data

| | 2nd Surface | 3rd Surface | 4th Surface | 5th Surface | 6th Surface |
|---|---|---|---|---|---|
| k | 2.422E−01 | 0.000E+00 | 0.000E+00 | −3.606E+00 | 0.000E+00 |
| A4 | 3.083E−03 | −6.884E−02 | −2.124E−01 | −8.041E−02 | −1.359E−01 |
| A6 | −6.044E−03 | 3.406E−01 | 6.075E−01 | 3.326E−01 | 3.874E−03 |
| A8 | −7.641E−03 | −6.662E−01 | −9.807E−01 | −3.716E−01 | −5.565E−02 |
| A10 | 1.146E−03 | 8.367E−01 | 1.115E+00 | 3.174E−01 | 4.841E−02 |
| A12 | 1.951E−02 | −6.098E−01 | −7.857E−01 | −1.589E−01 | −2.733E−02 |
| A14 | −1.568E−02 | 1.774E−01 | 2.355E−01 | 5.025E−02 | 0.000E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | 0.000E+00 | −3.928E+00 | 0.000E+00 | −7.007E+00 |
| A4 | −9.388E−02 | 6.244E−02 | −2.158E−02 | −1.297E−01 | −8.544E−02 |
| A6 | −4.248E−02 | −3.247E−02 | 4.277E−02 | 2.597E−02 | 2.733E−02 |
| A8 | −7.408E−03 | −2.286E−02 | −2.700E−02 | 1.856E−03 | −7.062E−03 |
| A10 | 3.688E−03 | 9.756E−03 | 7.239E−03 | −8.888E−04 | 1.044E−03 |
| A12 | 0.000E+00 | −1.882E−05 | −5.108E−04 | 6.383E−05 | −7.548E−05 |
| A14 | 0.000E+00 | 0.000E+00 | 0.000E+00 | 0.000E+00 | 1.848E−06 |
| A16 | 0.000E+00 | 0.000E+00 | 0.000E+00 | 0.000E+00 | 0.000E+00 |

As shown in Table 8, the imaging lens in Example 3 satisfies all the conditional expressions (1) to (10).

Figure 6:
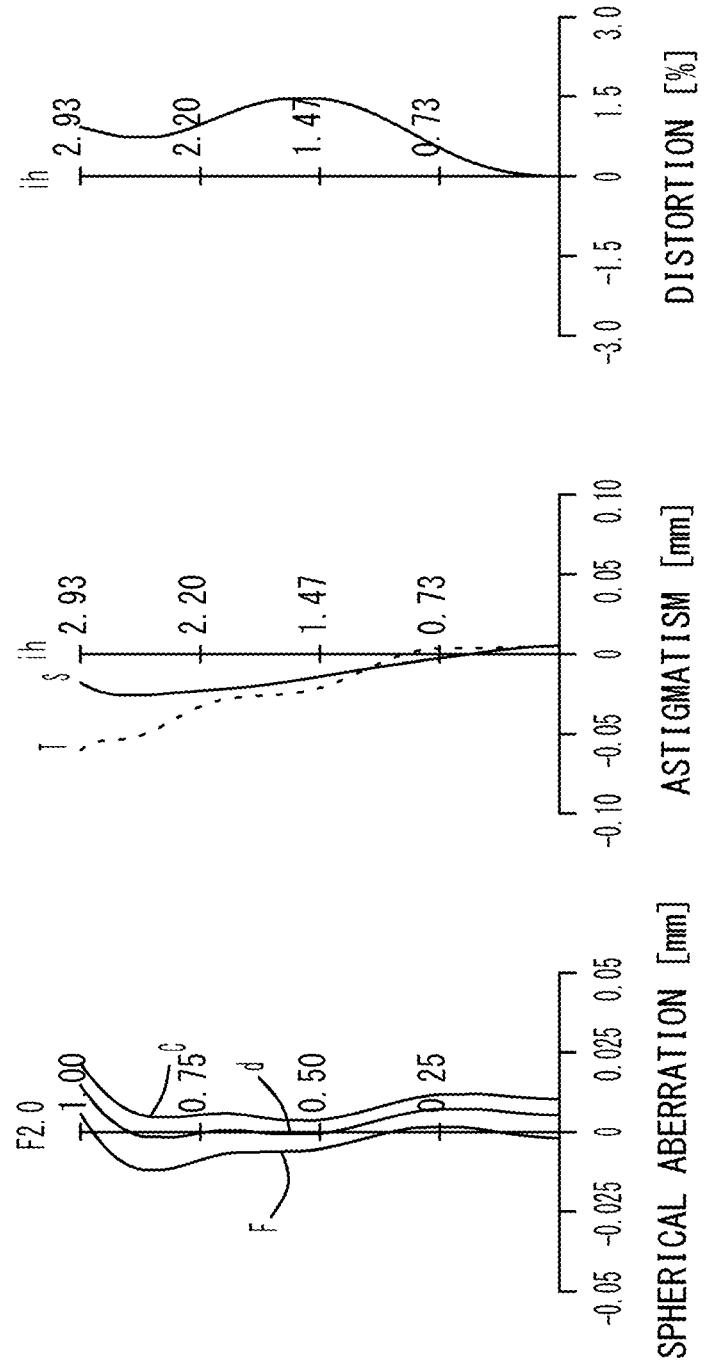
FIG. 6 shows spherical aberration, astigmatism, and distortion of the imaging lens in Example 3.
Figure 7:
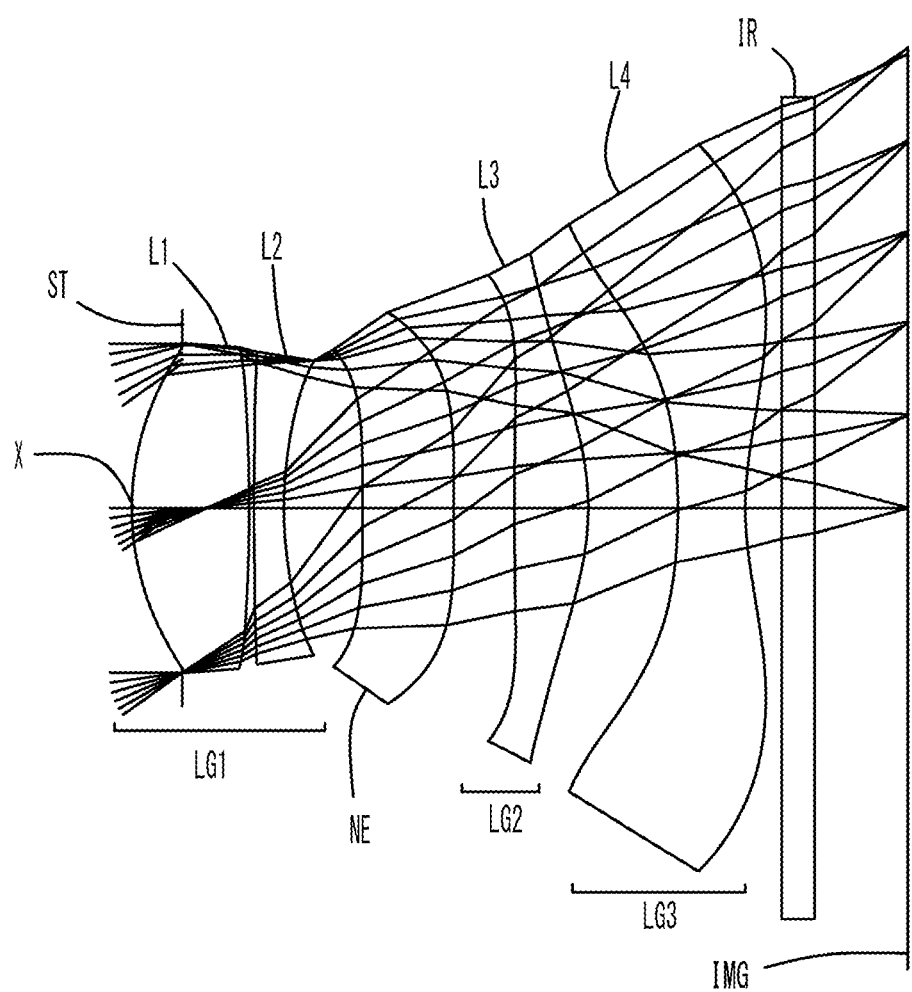
FIG. 7 is a schematic view showing the general configuration of an imaging lens in Example 4 according to the embodiment of the present invention.

FIG. 6 shows spherical aberration (mm), astigmatism (mm), and distortion (%) of the imaging lens in Example 3. As shown in FIG. 6, each aberration is corrected properly.

In Example 3, the total track length is 4.83 mm, which suggests that the imaging lens is low-profile though it uses five optical elements. Moreover, it provides a wide field of view of about 70 degrees and brightness with an F-value of 2.0.

EXAMPLE 4

The basic lens data of Example 4 is shown in Table 4 below.

TABLE 4 in mm f = 4.11
Fno = 2.0
ω(°) = 35.3
ih = 2.93
TLA = 4.87
bf = 0.97

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | −0.321 | | |
| 2* | 1.763 | 0.747 | 1.544 | 55.57 |

TABLE 4-continued

| | | | | |
|---|---|---|---|---|
| 3* | −12.640 | 0.030 | | |
| 4* | 11.398 | 0.190 | 1.635 | 23.91 |
| 5* | 2.322 | 0.501 | | |
| 6* | Infinity | 0.580 | 1.535 | 56.16 |
| 7* | Infinity | 0.387 | | |
| 8* | 40.964 | 0.469 | 1.544 | 55.57 |
| 9* | −1.715 | 0.571 | | |
| 10* | −3.980 | 0.429 | 1.535 | 56.16 |
| 11* | 2.103 | 0.230 | | |
| 12 | Infinity | 0.210 | 1.517 | 64.20 |
| 13 | Infinity | 0.600 | | |
| Image Plane | | | | |

| Constituent Lens Data | | | Lens Group Data | | |
|---|---|---|---|---|---|
| Lens | Start Surface | Focal Length | | Lens | Focal Length |
| 1 | 2 | 2.90 | 1st Optical Element Group (LG1) | Lens 1, 2 | 5.73 |
| 2 | 4 | −4.63 | | | |
| 3 | 8 | 3.04 | 2nd Optical Element Group (LG2) | Lens 3 | 3.04 |
| 4 | 10 | −2.51 | | | |
| | | | 3rd Optical Element Group (LG3) | Lens 4 | −2.51 |

Aspheric Surface Data

| | 2nd Surface | 3rd Surface | 4th Surface | 5th Surface | 6th Surface |
|---|---|---|---|---|---|
| k | 2.124E−01 | 0.000E+00 | 0.000E+00 | −4.827E+00 | 0.000E+00 |
| A4 | 2.005E−03 | −7.788E−02 | −2.160E−01 | −1.088E−01 | −1.526E−01 |
| A6 | −6.992E−03 | 3.301E−01 | 6.162E−01 | 3.191E−01 | 3.244E−02 |
| A8 | −9.355E−03 | −6.853E−01 | −9.979E−01 | −3.254E−01 | −7.239E−02 |
| A10 | −3.074E−03 | 8.469E−01 | 1.122E+00 | 2.625E−01 | 4.605E−02 |
| A12 | 1.951E−02 | −6.098E−01 | −7.857E−01 | −1.589E−01 | −2.733E−02 |
| A14 | −1.568E−02 | 1.774E−01 | 2.355E−01 | 5.025E−02 | 0.000E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | 0.000E+00 | −5.450E+00 | 0.000E+00 | −8.828E+00 |
| A4 | −1.391E−01 | 6.474E−03 | −7.912E−03 | −8.903E−02 | −7.811E−02 |
| A6 | −1.487E−02 | −4.307E−03 | 4.796E−02 | 1.602E−02 | 2.612E−02 |
| A8 | −2.529E−03 | −1.908E−02 | −2.867E−02 | 3.065E−02 | −6.599E−03 |
| A10 | −1.321E−03 | 7.613E−03 | 6.169E−03 | −5.860E−04 | 9.215E−04 |
| A12 | 0.000E+00 | −1.022E−03 | −3.491E−04 | 2.797E−06 | −6.064E−05 |
| A14 | 0.000E+00 | 0.000E+00 | 0.000E+00 | 0.000E+00 | 1.052E−06 |
| A16 | 0.000E+00 | 0.000E+00 | 0.000E+00 | 0.000E+00 | 0.000E+00 |

As shown in Table 8, the imaging lens in Example 4 satisfies all the conditional expressions (1) to (10).

Figure 8:
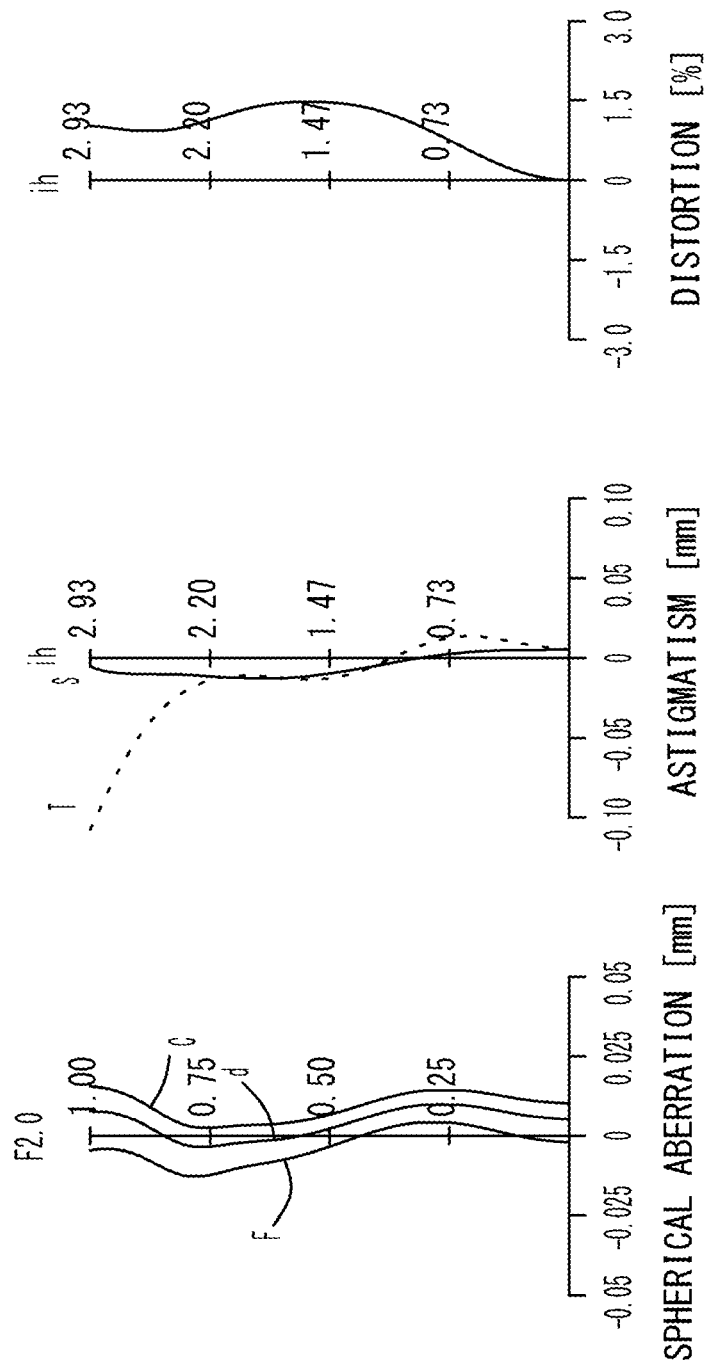
FIG. 8 shows spherical aberration, astigmatism, and distortion of the imaging lens in Example 4.
Figure 9:
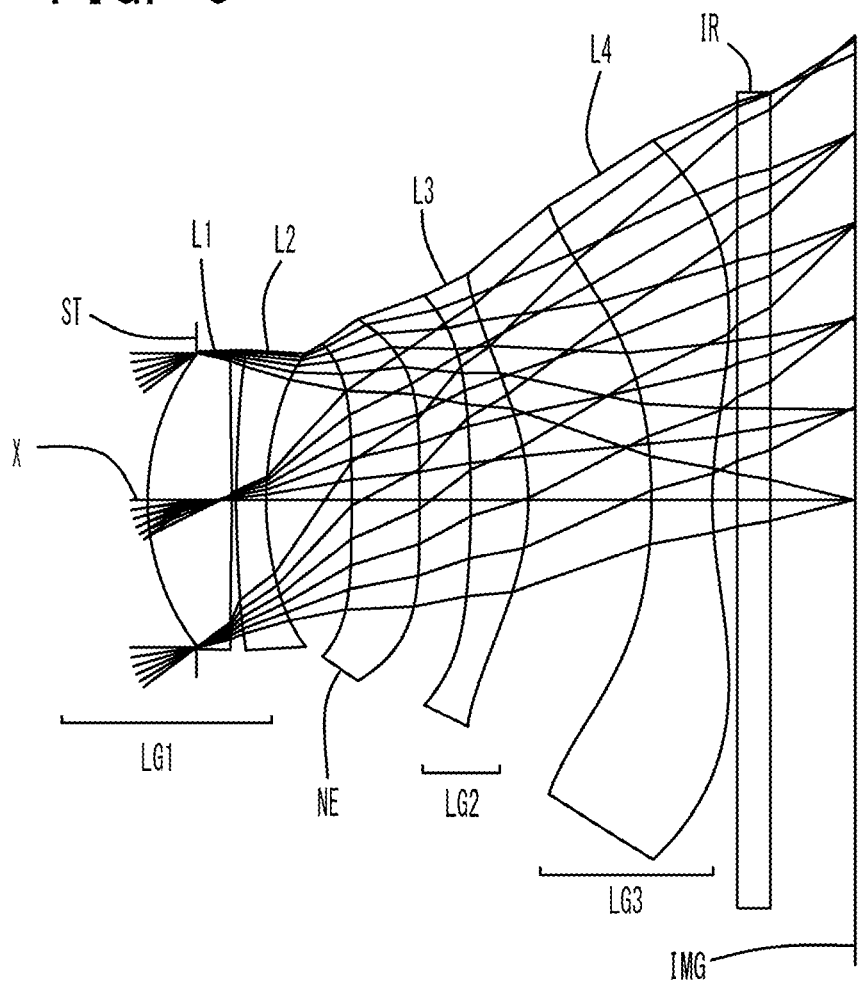
FIG. 9 is a schematic view showing the general configuration of an imaging lens in Example 5 according to the embodiment of the present invention.

FIG. 8 shows spherical aberration (mm), astigmatism (mm), and distortion (%) of the imaging lens in Example 4. As shown in FIG. 8, each aberration is corrected properly.

In Example 4, the total track length is 4.87 mm, which suggests that the imaging lens is low-profile though it uses five optical elements. Moreover, it provides a wide field of view of about 70 degrees and brightness with an F-value of 2.0.

EXAMPLE 5

The basic lens data of Example 5 is shown in Table 5 below.

TABLE 5 in mm f = 3.88
Fno = 2.1
ω(°) = 36.7
ih = 2.93
TLA = 4.43
bf = 0.84

Surface Data

| Surface No. i | Curvature Radius r | Surface Distance d | Refractive Index Nd | Abbe Number υd |
|---|---|---|---|---|
| (Object Surface) | Infinity | Infinity | | |
| 1 (Stop) | Infinity | −0.312 | | |
| 2* | 1.567 | 0.534 | 1.544 | 55.57 |

TABLE 5-continued

| | | | | |
|---|---|---|---|---|
| 3* | −48.853 | 0.030 | | |
| 4* | 5.406 | 0.190 | 1.635 | 23.91 |
| 5* | 1.924 | 0.544 | | |
| 6* | Infinity | 0.432 | 1.535 | 56.16 |
| 7* | Infinity | 0.326 | | |
| 8* | −6.941 | 0.367 | 1.544 | 55.57 |
| 9* | −1.516 | 0.783 | | |
| 10* | −3.800 | 0.388 | 1.535 | 56.16 |
| 11* | 2.532 | 0.160 | | |
| 12 | Infinity | 0.210 | 1.517 | 64.20 |
| 13 | Infinity | 0.541 | | |
| Image Plane | | | | |

| Constituent Lens Data | | | Lens Group Data | | |
|---|---|---|---|---|---|
| Lens | Start Surface | Focal Length | | Lens | Focal Length |
| 1 | 2 | 2.80 | 1st Optical Element Group (LG1) | Lens 1, 2 | 5.27 |
| 2 | 4 | −4.81 | | | |
| 3 | 8 | 3.48 | 2nd Optical Element Group (LG2) | Lens 3 | 3.48 |
| 4 | 10 | −2.78 | | | |
| | | | 3rd Optical Element Group (LG3) | Lens 4 | −2.78 |

Aspheric Surface Data

| | 2nd Surface | 3rd Surface | 4th Surface | 5th Surface | 6th Surface |
|---|---|---|---|---|---|
| k | 3.238E−01 | 0.000E+00 | 0.000E+00 | −2.783E+00 | 0.000E+00 |
| A4 | 1.303E−03 | −7.482E−02 | −2.154E−01 | −9.312E−02 | −1.565E−01 |
| A6 | −1.657E−02 | 3.419E−01 | 6.084E−01 | 3.238E−01 | 1.970E−02 |
| A8 | 1.191E−02 | −6.905E−01 | −1.009E+00 | −3.404E−01 | −5.748E−02 |
| A10 | −1.644E−02 | 8.565E−01 | 1.144E+00 | 2.918E−01 | 3.412E−02 |
| A12 | 1.950E−02 | −6.098E−01 | −7.857E−01 | −1.589E−01 | −2.733E−02 |
| A14 | −1.568E−02 | 1.774E−01 | 2.355E−01 | 5.025E−02 | 0.000E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 0.000E+00 | 0.000E+00 | −4.280E+00 | 0.000E+00 | −1.123E+01 |
| A4 | −1.516E−01 | 1.055E−02 | −2.766E−02 | −6.504E−02 | −6.758E−02 |
| A6 | −3.383E−02 | −3.004E−02 | 5.240E−02 | 1.142E−02 | 2.173E−02 |
| A8 | −1.250E−02 | −2.477E−02 | −2.761E−02 | 3.132E−03 | −6.288E−03 |
| A10 | −1.590E−03 | 9.263E−03 | 6.397E−03 | −7.375E−04 | 1.014E−03 |
| A12 | 0.000E+00 | 1.102E−03 | −1.386E−04 | 3.586E−05 | −8.117E−05 |
| A14 | 0.000E+00 | 0.000E+00 | 0.000E+00 | 0.000E+00 | 2.424E−06 |
| A16 | 0.000E+00 | 0.000E+00 | 0.000E+00 | 0.000E+00 | 0.000E+00 |

As shown in Table 8, the imaging lens in Example 5 satisfies all the conditional expressions (1) to (10).

Figure 10:
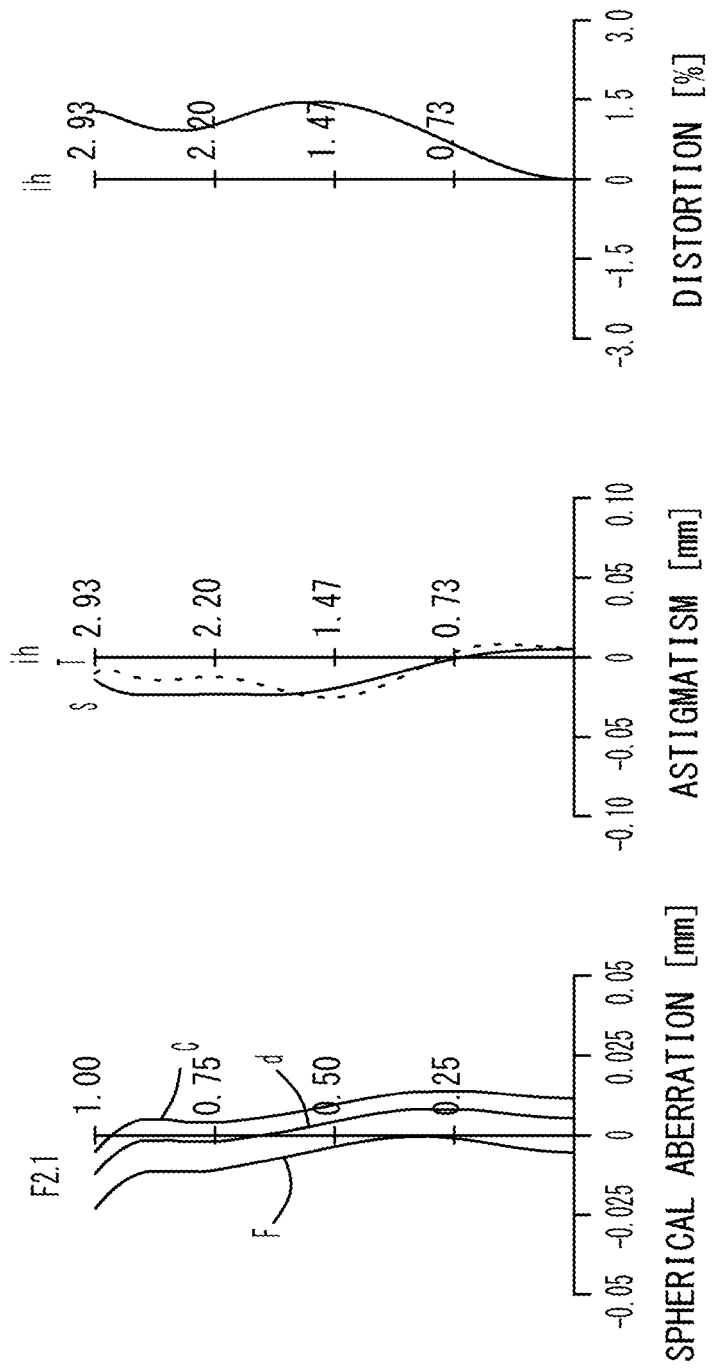
FIG. 10 shows spherical aberration, astigmatism, and distortion of the imaging lens in Example 5.
Figure 11:
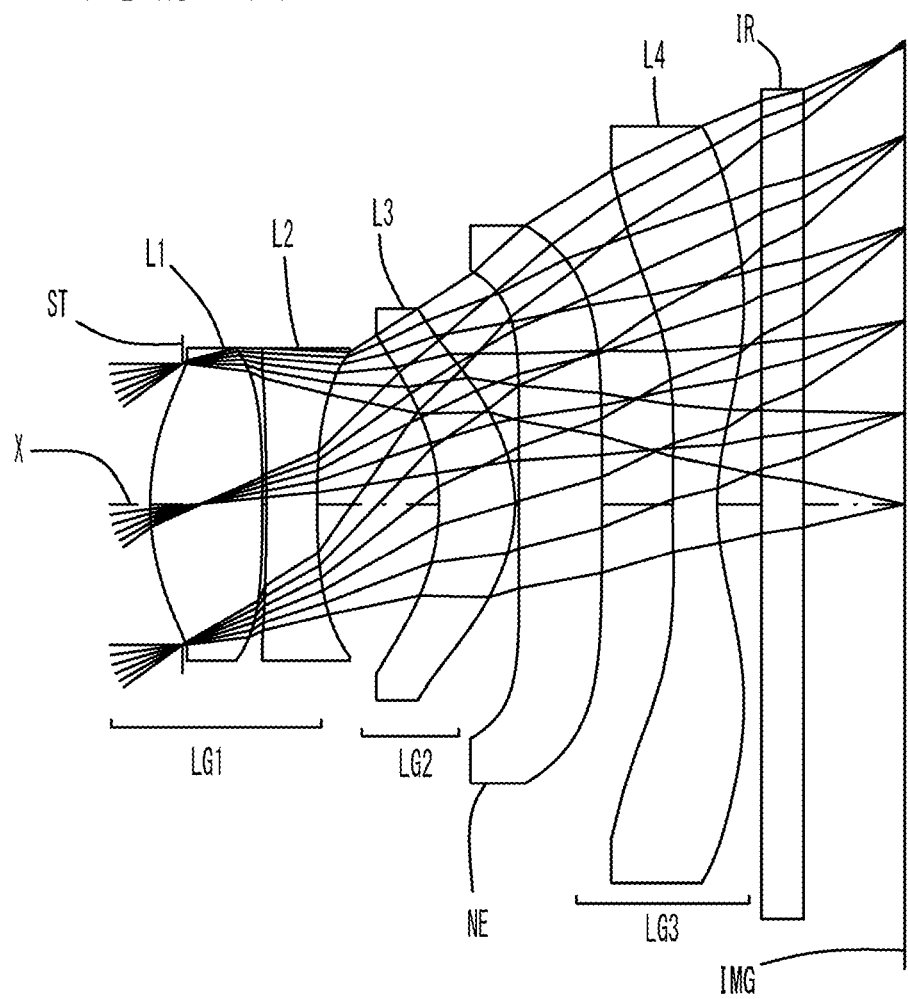
FIG. 11 is a schematic view showing the general configuration of an imaging lens in Example 6 according to the embodiment of the present invention.

FIG. 10 shows spherical aberration (mm), astigmatism (mm), and distortion (%) of the imaging lens in Example 5. As shown in FIG. 10, each aberration is corrected properly.

In Example 5, the total track length is 4.43 mm, which suggests that the imaging lens is low-profile though it uses five optical elements. Moreover, it provides a wide field of view of about 73 degrees and brightness with an F-value of 2.1.

EXAMPLE 6

The basic lens data of Example 6 is shown in Table 6 below.

TABLE 6 in mm f = 3.16
Fno = 2.3
$\omega(°)$ = 35.8
ih = 2.30
TLA = 3.68
bf = 0.86

Surface Data

| Surface No. i | Curvature Radius r | Surface Distance d | Refractive Index Nd | Abbe Number υd |
|---|---|---|---|---|
| (Object Surface) | Infinity | Infinity | | |
| 1 (Stop) | Infinity | −0.160 | | |
| 2* | 1.299 | 0.558 | 1.544 | 55.57 |

TABLE 6-continued

| | | | | |
|---|---|---|---|---|
| 3* | −13.889 | 0.020 | | |
| 4* | −13.824 | 0.251 | 1.635 | 23.91 |
| 5* | 4.239 | 0.607 | | |
| 6* | −1.105 | 0.378 | 1.544 | 55.57 |
| 7* | −0.803 | 0.020 | | |
| 8* | Infinity | 0.412 | 1.535 | 56.16 |
| 9* | Infinity | 0.353 | | |
| 10* | 8.717 | 0.221 | 1.535 | 56.16 |
| 11* | 1.320 | 0.220 | | |
| 12 | Infinity | 0.210 | 1.517 | 64.20 |
| 13 | Infinity | 0.502 | | |
| Image Plane | | | | |

| Constituent Lens Data | | | Lens Group Data | | |
|---|---|---|---|---|---|
| Lens | Start Surface | Focal Length | | Lens | Focal Length |
| 1 | 2 | 2.21 | 1st Optical Element Group (LG1) | Lens 1, 2 | 3.36 |
| 2 | 4 | −5.08 | | | |
| 3 | 6 | 3.75 | 2nd Optical Flement Group (LG2) | Lens 3 | 3.75 |
| 4 | 10 | −2.94 | 3rd Optical Element Group (LG3) | Lens 4 | −2.94 |

Aspheric Surface Data

| | 2nd Surface | 3rd Surface | 4th Surface | 5th Surface | 6th Surface |
|---|---|---|---|---|---|
| k | −3.580E−02 | 0.000E+00 | 0.000E+00 | 1.374E+01 | −8.947E−01 |
| A4 | −4.195E−02 | −3.151E−01 | −1.069E−01 | 2.013E−01 | −5.752E−02 |
| A6 | 2.760E−02 | 9.279E−01 | 1.073E+00 | 2.598E−01 | −5.192E−02 |
| A8 | −2.923E−01 | −3.840E+00 | −4.374E+00 | −8.222E−01 | 4.144E−01 |
| A10 | −1.964E−03 | 6.899E+00 | 8.096E+00 | 1.373E+00 | −6.168E−02 |
| A12 | 6.800E−01 | −6.215E+00 | −7.253E+00 | −1.230E+00 | −2.396E−01 |
| A14 | −1.631E+00 | 2.060E+00 | 3.012E+00 | 7.572E−01 | 0.000E+00 |
| A16 | −7.621E−02 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | −2.580E+00 | 0.000E+00 | 0.000E+00 | 0.000E+00 | −6.674E+00 |
| A4 | −2.408E−01 | 2.696E−02 | −4.295E−02 | −2.370E−01 | −1.810E−01 |
| A6 | 1.283E−01 | −1.201E−01 | −1.950E−02 | 7.941E−02 | 9.385E−02 |
| A8 | −5.707E−04 | 7.478E−02 | −6.760E−04 | 1.147E−02 | −3.701E−02 |
| A10 | 9.727E−02 | −5.149E−02 | −2.919E−03 | −9.529E−03 | 1.094E−02 |
| A12 | 1.726E−02 | 0.000E+00 | 0.000E+00 | 1.205E−03 | −1.899E−03 |
| A14 | −6.316E−02 | 0.000E+00 | 0.000E+00 | 0.000E+00 | 1.301E−04 |
| A16 | 0.000E+00 | 0.000E+00 | 0.000E+00 | 0.000E+00 | 0.000E+00 |

As shown in Table 8, the imaging lens in Example 6 satisfies all the conditional expressions (1) to (10).

Figure 12:
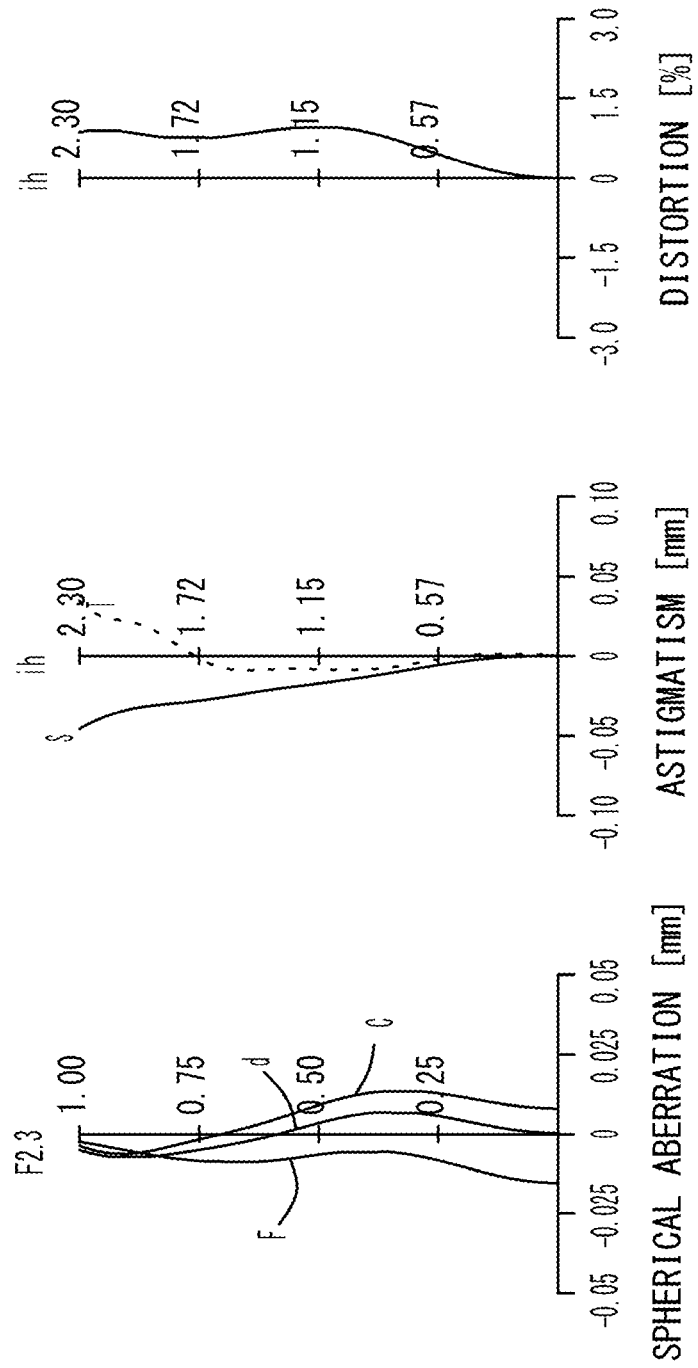
FIG. 12 shows spherical aberration, astigmatism, and distortion of the imaging lens in Example 6.
Figure 13:
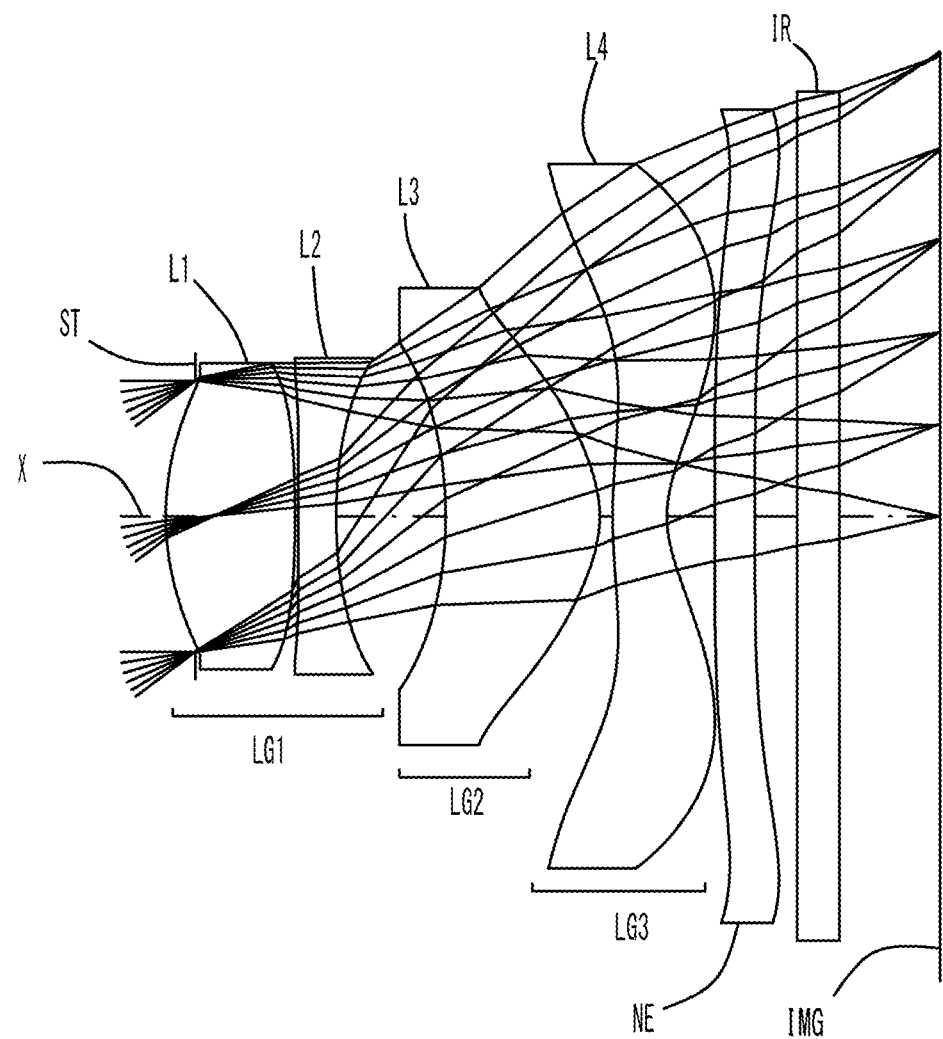
FIG. 13 is a schematic view showing the general configuration of an imaging lens in Example 7 according to the embodiment of the present invention.

FIG. 12 shows spherical aberration (mm), astigmatism (mm), and distortion (%) of the imaging lens in Example 6. As shown in FIG. 12, each aberration is corrected properly.

In Example 6, the total track length is 3.68 mm, which suggests that the imaging lens is low-profile though it uses five optical elements. Moreover, it provides a wide field of view of about 72 degrees and brightness with an F-value of 2.3.

EXAMPLE 7

The basic lens data of Example 7 is shown in Table 7 below.

TABLE 7 in mm f = 3.04
Fno = 2.2
ω(°) = 37.0
ih = 2.30
TLA = 3.78
bf = 1.29

Surface Data

| Surface No. i | Curvature Radius r | Surface Distance d | Refractive Index Nd | Abbe Number υd |
|---|---|---|---|---|
| (Object Surface) | Infinity | Infinity | | |
| 1 (Stop) | Infinity | −0.147 | | |
| 2* | 1.376 | 0.642 | 1.544 | 55.57 |

TABLE 7-continued

| | | | | |
|---|---|---|---|---|
| 3* | −6.877 | 0.015 | | |
| 4* | 20.780 | 0.190 | 1.635 | 23.91 |
| 5* | 2.356 | 0.545 | | |
| 6* | −2.016 | 0.766 | 1.544 | 55.57 |
| 7* | −0.610 | 0.064 | | |
| 8* | 2.923 | 0.270 | 1.535 | 56.16 |
| 9* | 0.561 | 0.238 | | |
| 10* | Infinity | 0.200 | 1.535 | 56.16 |
| 11* | Infinity | 0.210 | | |
| 12 | Infinity | 0.210 | 1.517 | 64.20 |
| 13 Image Plane | Infinity | 0.501 | | |

| Constituent Lens Data | | | Lens Group Data | | |
|---|---|---|---|---|---|
| Lens | Start Surface | Focal Length | | Lens | Focal Length |
| 1 | 2 | 2.17 | 1st Optical Element Group (LG1) | Lens 1, 2 | 3.59 |
| 2 | 4 | −4.20 | 2nd Optical Element Group (LG2) | Lens 3 | 1.35 |
| 3 | 6 | 1.35 | | | |
| 4 | 8 | −1.35 | 3rd Optical Element Group (LG3) | Lens 4 | −1.35 |

Aspheric Surface Data

| | 2nd Surface | 3rd Surface | 4th Surface | 5th Surface | 6th Surface |
|---|---|---|---|---|---|
| k | 4.540E−02 | 1.943E+01 | 0.000E+00 | 5.091E+00 | 5.710E−01 |
| A4 | −5.104E−02 | −2.582E−01 | −1.939E−01 | 4.344E−02 | 2.973E−02 |
| A6 | 1.173E−01 | 9.504E−01 | 1.031E+00 | 9.404E−02 | −2.615E−01 |
| A8 | −3.819E−01 | −3.813E+00 | −4.297E+00 | −7.332E−01 | 3.604E−01 |
| A10 | 9.045E−03 | 6.848E+00 | 8.155E+00 | 1.596E+00 | −1.984E−01 |
| A12 | 7.462E−01 | −6.288E+00 | −7.332E+00 | −1.432E+00 | −1.182E−05 |
| A14 | −1.145E+00 | 2.367E+00 | 2.903E+00 | 6.301E−01 | 0.000E+00 |
| A16 | 4.398E−11 | 2.078E−05 | 0.000E+00 | 0.000E+00 | 0.000E+00 |

| | 7th Surface | 8th Surface | 9th Surface | 10th Surface | 11th Surface |
|---|---|---|---|---|---|
| k | −4.387E+00 | 0.000E+00 | −5.466E+00 | 0.000E+00 | 0.000E+00 |
| A4 | −2.214E−01 | −2.930E−01 | −1.806E−01 | 2.284E−02 | 2.862E−02 |
| A6 | 1.126E−01 | 7.071E−02 | 8.694E−02 | −4.013E−03 | −3.626E−03 |
| A8 | −9.494E−02 | 1.607E−02 | −4.180E−02 | −3.028E−04 | −5.976E−04 |
| A10 | 5.552E−02 | −9.169E−03 | 1.181E−02 | 8.434E−06 | 2.217E−05 |
| A12 | 5.303E−02 | 1.059E−03 | −1.612E−03 | 0.000E+00 | 0.000E+00 |
| A14 | −3.201E−02 | 0.000E+00 | 6.331E−05 | 0.000E+00 | 0.000E+00 |
| A16 | 0.000E+00 | 0.000E+00 | 0.000E+00 | 0.000E+00 | 0.000E+00 |

As shown in Table 8, the imaging lens in Example 7 satisfies all the conditional expressions (1) to (10).

Figure 14:
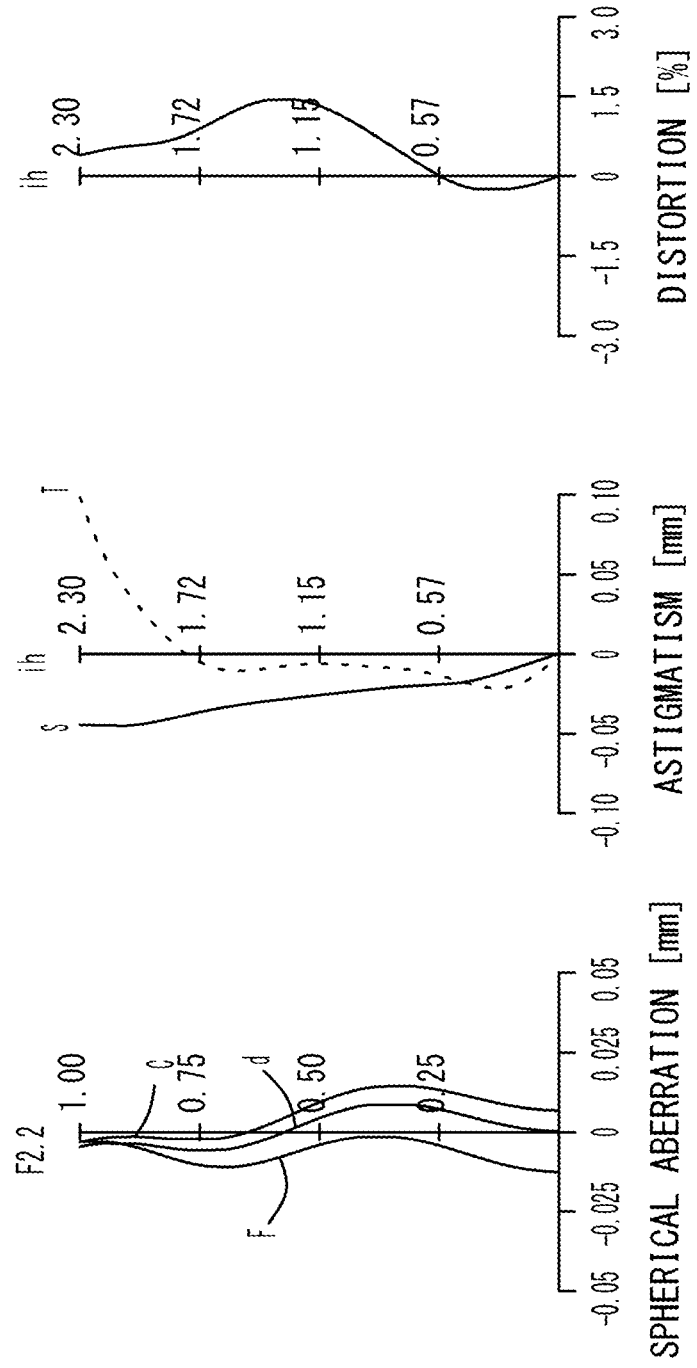
FIG. 14 shows spherical aberration, astigmatism, and distortion of the imaging lens in Example 7.

FIG. 14 shows spherical aberration (mm), astigmatism (mm), and distortion (%) of the imaging lens in Example 7. As shown in FIG. 14, each aberration is corrected properly.

In Example 7, the total track length is 3.78 mm, which suggests that the imaging lens is low-profile though it uses five optical elements. Moreover, it provides a wide field of view of about 74 degrees and brightness with an F-value of 2.2.

As explained above, the imaging lenses composed of five optical elements in the examples according to this embodiment of the present invention are compact enough to meet the growing demand for low-profileness, with a total track length of 5.0 mm or less, though they use five optical elements in total, specifically four optical elements and one aberration correction optical element with virtually no refractive power. When the degree of low-profileness is expressed by the ratio of total track length TLA to maximum image height ih (TLA/2ih), the TLA/2ih ratio of each of these imaging lenses is 0.85 or less. In addition, the imaging lenses offer a wide field of view of 70 degrees or more and brightness with an F-value of 2.4 or less, and correct various aberrations properly and can be manufactured at low cost.

Table 8 shows data on Examples 1 to 7 in relation to the conditional expressions (1) to (10).

TABLE 8

| | Example 1 | Example 2 | Example 3 | Example 4 | Example 5 | Example 6 | Example 7 |
|---|---|---|---|---|---|---|---|
| (1) TN/f | 0.34 | 0.37 | 0.34 | 0.36 | 0.34 | 0.25 | 0.45 |
| (2) vdN | 56.16 | 56.16 | 56.16 | 56.16 | 56.16 | 56.16 | 56.16 |
| (3) (d2/f)*100 | 5.21 | 4.61 | 4.91 | 4.63 | 4.90 | 7.95 | 6.26 |
| (4) (t1/f)*100 | 1.26 | 0.70 | 0.57 | 0.73 | 0.77 | 0.63 | 0.49 |
| (5) fLG1/f | 1.38 | 1.24 | 1.30 | 1.40 | 1.36 | 1.07 | 1.18 |
| (6) fLG2/f | 0.68 | 0.62 | 0.78 | 0.74 | 0.90 | 1.19 | 0.44 |
| (7) fLG3/f | −0.61 | −0.51 | −0.68 | −0.61 | −0.72 | −0.93 | −0.45 |
| (8) (r5 + r6)/(r5 − r6) | 1.38 | 1.18 | 1.79 | 0.92 | 1.56 | 6.33 | 1.87 |

TABLE 8-continued

|  | Example 1 | Example 2 | Example 3 | Example 4 | Example 5 | Example 6 | Example 7 |
|---|---|---|---|---|---|---|---|
| (9)fLG1 > fLG2 | 5.7 > 2.79 | 5.11 > 2.55 | 5.45 > 3.27 | 5.73 > 3.04 | 5.27 > 3.48 | 3.36 > 3.75 | 3.59 > 1.35 |
| (10)fLG2 ≥ \|fLG3\| | 2.79 ≥ 2.5 | 2.55 ≥ 2.09 | 3.27 ≥ 2.86 | 3.04 ≥ 2.51 | 3.48 ≥ 2.78 | 3.75 ≥ 2.94 | 1.35 ≥ 1.35 |

When any one of the imaging lenses composed of five optical elements in the examples according to this embodiment of the present invention is used in the optical system built in the image pickup device mounted in an increasingly compact and low-profile mobile terminal such as a smartphone, mobile phone or PDA (Personal Digital Assistant), a game console, an information terminal such as a PC, or a home appliance with a camera function, it contributes to the low-profileness of the image pickup device and provides high camera performance.

The effects of the present invention are as follows. According to the present invention, there is provided a compact low-cost imaging lens which meets the demand for low-profileness, offers brightness with an F-value of 2.4 or less and a wide field of view, and corrects various aberrations properly.

What is claimed is:

1. An imaging lens that includes five optical elements, the imaging lens forming an image of an object on a solid-state image sensor, having an F-value of 2.4 or less, and having a field of view of 70 degrees or more, the imaging lens comprising:
a first optical element group with positive refractive power, the first optical element group including:
a first lens with positive refractive power having a convex surface on the object side as a first optical element; and
a second lens with negative refractive power having a concave surface on the image side as a second optical element;
a second optical element group with positive refractive power, the second optical element group including a third lens that is a meniscus lens having positive refractive power and a convex surface on the image side as a third optical element;
a third optical element group with negative refractive power, the third optical element group including a fourth double-sided aspheric lens with negative refractive power having a concave surface on the image side as a fourth optical element; and
as a fifth optical element, a double-sided aspheric aberration correction optical element having a flat surface near the optical axis on both sides, the fifth optical element being located in an air gap nearer to an image plane than the first optical element group,
wherein:
the image-side surface of the fourth lens has at least one pole-change point off an optical axis;
the first optical element, the second optical element, the third optical element, and the fourth optical element are arranged in order from an object side to an image side,
conditional expressions (2) and (4b) below are satisfied:

$$40 < vdN < 60 \quad (2)$$

$$0.49 < (t1/f) \times 100 < 1.26 \quad (4b)$$

where:
vdN: Abbe number of the aberration correction optical element at d-ray,
t1: air gap on the optical axis between the first lens and the second lens, and
f: focal length of the overall optical system of the imaging lens.

2. The imaging lens according to claim 1, wherein the double-sided aspheric aberration correction optical element is located between the first optical element group and the second optical element group.

3. The imaging lens according to claim 1, wherein the double-sided aspheric aberration correction optical element is located between the second optical element group and the third optical element group.

4. The imaging lens according to claim 1, wherein the double-sided aspheric aberration correction optical element is located on the image side of the third optical element group.

5. The imaging lens according to claim 1, wherein conditional expression (1) below is satisfied:

$$0.1 < TN/f < 0.5 \quad (1)$$

where:
TN: distance on the optical axis of an air gap where the aberration correction optical element is located, and
f: focal length of an overall optical system of the imaging lens.

6. The imaging lens according to claim 1, wherein conditional expression (3) below is satisfied:

$$4.0 < (d2/f) \times 100 < 10.0 \quad (3)$$

where:
d2: thickness of the second lens on the optical axis, and
f: focal length of the overall optical system of the imaging lens.

7. The imaging lens according to claim 1, wherein aspheric surfaces on both sides of the double-sided aspheric aberration correction optical element are shaped so as to curve toward the object side with increasing distance from the optical axis.

8. The imaging lens according to claim 1, wherein conditional expression (5) below is satisfied:

$$0.85 < fLG1/f < 1.7 \quad (5)$$

where:
fLG1: focal length of the first optical element group, and
f: focal length of the overall optical system of the imaging lens.

9. The imaging lens according to claim 1, wherein conditional expression (6) below is satisfied:

$$0.3 < fLG2/f < 1.4 \quad (6)$$

where:
fLG2: focal length of the second optical element group, and
f: focal length of the overall optical system of the imaging lens.

10. The imaging lens according to claim 1, wherein conditional expression (7) below is satisfied:

$$-1.2 < fLG3/f < -0.2 \qquad (7)$$

where:
- fLG3: focal length of the third optical element group, and
- f: focal length of the overall optical system of the imaging lens.

11. The imaging lens according to claim 1, wherein a conditional expression (8) below is satisfied:

$$0.7 < (r5+r6)/(r5-r6) < 6.5 \qquad (8)$$

where:
- r5: curvature radius of the object-side surface of the third lens constituting the second optical element group, and
- r6: curvature radius of the image-side surface of the third lens constituting the second optical element group.

12. The imaging lens according to claim 5, wherein conditional expression (3) below is satisfied:

$$4.0 < (d2/f) \times 100 < 10.0 \qquad (3)$$

where:
- d2: thickness of the second lens on the optical axis, and
- f: focal length of the overall optical system of the imaging lens.

13. The imaging lens according to claim 6, wherein aspheric surfaces on both sides of the double-sided aspheric aberration correction optical element are shaped so as to curve toward the object side with increasing distance from the optical axis.

14. The imaging lens according to claim 6, wherein conditional expression (5) below is satisfied:

$$0.85 < fLG1/f < 1.7 \qquad (5)$$

where:
- fLG1: focal length of the first optical element group, and
- f: focal length of the overall optical system of the imaging lens.

15. The imaging lens according to claim 8, wherein conditional expression (6) below is satisfied:

$$0.3 < fLG2/f < 1.4 \qquad (6)$$

where:
- fLG2: focal length of the second optical element group, and
- f: focal length of the overall optical system of the imaging lens.

16. The imaging lens according to claim 9, wherein conditional expression (7) below is satisfied:

$$-1.2 < fLG3/f < -0.2 \qquad (7)$$

where:
- fLG3: focal length of the third optical element group, and
- f: focal length of the overall optical system of the imaging lens.

17. The imaging lens according to claim 5, wherein conditional expression (8) below is satisfied:

$$0.7 < (r5+r6)/(r5-r6) < 6.5 \qquad (8)$$

where:
- r5: curvature radius of the object-side surface of the third lens constituting the second optical element group, and
- r6: curvature radius of the image-side surface of the third lens constituting the second optical element group.

* * * * *